United States Patent [19]

Chung

[11] Patent Number: 4,515,932

[45] Date of Patent: May 7, 1985

[54] END-CAPPING CATALYSTS FOR FORMING ALKOXY-FUNCTIONAL ONE COMPONENT RTV COMPOSITIONS

[75] Inventor: Rack H. Chung, Clifton Park, N.Y.

[73] Assignee: General Electric Company, Waterford, N.Y.

[21] Appl. No.: 608,522

[22] Filed: May 8, 1984

Related U.S. Application Data

[63] Continuation of Ser. No. 427,930, Sep. 29, 1982, abandoned.

[51] Int. Cl.$^3$ .............................................. C08G 77/06
[52] U.S. Cl. ....................................... 528/16; 528/12; 528/18; 528/21; 528/23; 528/33; 528/34
[58] Field of Search ....................... 528/21, 23, 16, 12, 528/33, 34, 18

[56] References Cited

U.S. PATENT DOCUMENTS

| | | | |
|---|---|---|---|
| 2,381,366 | 8/1945 | Patnode | 556/452 |
| 2,421,653 | 6/1947 | Sauer | 556/452 |
| 2,429,883 | 10/1947 | Johannson | 556/410 |
| 2,462,635 | 2/1949 | Haber | 556/409 |
| 2,503,919 | 4/1950 | Patnode | 556/409 |
| 2,579,416 | 12/1951 | Cheronis | 528/10 |
| 2,579,417 | 12/1951 | Cheronis | 528/422 |
| 2,579,418 | 12/1951 | Cheronis | 528/39 |
| 2,629,726 | 2/1953 | Hyde | 556/451 |
| 2,758,127 | 8/1956 | Goldschmidt et al. | 556/458 |
| 2,807,635 | 9/1957 | Breederveld et al. | 556/410 |
| 2,865,918 | 12/1958 | Hurwitz et al. | 544/69 |
| 2,885,370 | 5/1959 | Groszos et al | 528/37 |
| 2,902,507 | 9/1959 | Hyde et al. | 556/452 |
| 3,035,016 | 5/1962 | Bruner | 528/34 |
| 3,078,255 | 2/1963 | Pike | 528/34 |
| 3,127,363 | 3/1964 | Nitzsche et al. | 528/34 |
| 3,133,891 | 5/1964 | Ceyzeriat | 528/18 |
| 3,231,527 | 1/1966 | Ceyzeriat | 528/901 |
| 3,243,404 | 3/1966 | Martellock | 524/188 |
| 3,296,161 | 1/1967 | Kulpa | 260/18 |
| 3,334,067 | 8/1967 | Weyenberg | 528/17 |
| 3,451,964 | 6/1969 | Creamer | 528/34 |
| 3,560,442 | 2/1971 | Golitz et al. | 528/901 |
| 3,772,240 | 11/1973 | Greenlee | 528/901 |
| 4,100,129 | 7/1978 | Beers | 524/425 |
| 4,180,642 | 12/1979 | Takago | 528/32 |
| 4,248,993 | 2/1981 | Takago | 528/38 |
| 4,257,932 | 3/1981 | Beers | 528/34 |
| 4,301,269 | 11/1981 | Hashimoto et al. | 528/34 |

OTHER PUBLICATIONS

R. O. Sauer et al., J.A.C.S., vol. 68, 1946, pp. 241–244.

Primary Examiner—Melvyn I. Marquis

[57] ABSTRACT

The present invention relates to a shelf stable one component alkoxy-functional RTV composition. In particular, there is utilized a novel end-capping catalyst alone or with a co-catalyst to form a poly-alkoxy terminated diorganopolysiloxane polymer. Such a polymer is formed by reacting a silanol terminal diorganopolysiloxane, either with a polyalkoxy containing silazane cross-linking agent or an integrated cross-linker, scavenger in the presence of the end-capping catalyst.

65 Claims, No Drawings

END-CAPPING CATALYSTS FOR FORMING ALKOXY-FUNCTIONAL ONE COMPONENT RTV COMPOSITIONS

This application is a continuation of application Ser. No. 427,930, filed Sept. 29, 1982, now abandoned.

BACKGROUND OF THE INVENTION

The present invention relates to room temperature vulcanizable silicone rubber compositions (room temperature vulcanizable will hereafter be referred to as RTV) and more particularly the present invention relates to RTV silicone rubber compositions which are alkoxy functional, shelf stable, and fast curing.

One component RTV silicone rubber compositions are well known. Basically, the earliest of such compositions comprised mixing in a substantially anhydrous state, a silanol end-stopped diorganopolysiloxane polymer, with or without filler, with an acyloxy functional cross-linking agent in the presence of a condensation catalyst. This composition by itself or with other ingredients was stable and a fluid in the substantial absence of moisture. But when exposed to atmospheric moisture would cross-link to form a silicone elastomer; see for instance Ceyzeriat, U.S. Pat. No. 3,133,891 and Bruner U.S. Pat. No. 3,035,016.

As development progressed in this area, compositions were produced in which the cross-linking agent had functionality other than acyloxy functionality such as amine functionality, amide functionality, alkoxy functionality, etc. One particular useful functionality for such one component RTV silicone rubber composition was alkoxy functionality. An example of an RTV composition which has such alkoxy functionality is for instance to be found in Beers U.S. Pat. No. 4,100,129. There are a great number of patents in this area and all of them cannot be gone into. Suffice it to state that there were many variations and particularly patented variations of a one-component RTV silicone rubber composition in which the cross-linking agent was an alkoxy functional silane and in which the curing catalyst was a chelate and preferably a titanium chelate of which the foregoing Beers U.S. Pat. No. 4,100,129 is exemplary.

One of the advantages of such compositions was basically that it was non-corrosive; that is, upon hydrolysis of the cross-linking agent and curing of the composition, it emitted an alcohol which is substantially non-corrosive to most substances. Further, the composition did not emit a pungent odor and the cured silicone rubber composition had all the properties of silicone elastomers. However, such compositions had some disadvantages in that they were not as fast curing as would be desired; and, in some cases, after storage periods of six months or a year or more would not cure or would cure very slowly. As a matter of fact, some subsequent detailed studies of such compositions after the foregoing patents were obtained and after the compositions had been commercialized, indicated that the cure rate of shelf stability of the compositions was affected after storage periods as small as two weeks or a month.

There were many hypothesis put forward as to why the slowing of the cure rate occurred. One hypothesis for instance was to be found in the patent application of White, et al, Ser. No. 277,524, filed June 26, 1981, now U.S. Pat. No. 4,395,526, which postulates that excess hydroxy groups in the compositions hydrolyzed the alkoxy groups on the end capped polymer making the polyalkoxy functional polymer resistant to curing or slowing down the cure rate. The inventors of the White, et al, patent application attempted to solve this difficulty by the use of scavenger compounds and integrated cross-linker, scavenger compounds which would because of the scavenging groups react and tie up hydroxy groups in the polymer system, thus resulting in most of the polymer composition having polymers in which the alkoxy functional groups remain intact. It was postulated and as the experimental results indicate, the result was a shelf stable, one component RTV alkoxy functional composition. Also see the patent application of Halgren, Ser. No. 277,525, filed on June 26, 1981, now U.S. Pat. No. 4,377,706, which relates to a process for producing certain scavengers which are utilized in the White, et al, systems.

Other patent applications in this area which deal with the use of integrated cross-linker scavengers to tie up free hydroxy groups in the RTV polymer composition so as to result in a shelf stable, fast curing one component RTV system are as follows: Chung, Ser. No. 338,518, filed Jan. 11, 1982, now U.S. Pat. No. 4,424,157; Beers, Ser. No. 349,537, filed Feb. 17, 1982, now abandoned; Dziark, Ser. No. 349,695, filed Feb. 17, 1982, now U.S. Pat. No. 4,417,042; and Lucas and Dziark, Ser. No. 349,538, filed Feb. 17, 1982, now U.S. Pat. No. 4,483,973. Of particular interest is the patent application of Dziark, which deals with the use of silazanes as solely scavenging agents which are introduced into the RTV system after the silanol containing diorganopolysiloxane polymer is end capped with the alkoxy functional cross-linking agent which most frequently is methyltrimethoxysilane.

In the other patent applications, there is disclosed that there may be utilized optionally an alkoxy functional silane as an integrated cross-linking scavenger agent which has the properties specified. It is disclosed in those patent applications, that to end cap the silanol, end-stopped polysiloxane polymer with a polyalkoxy functional silane, it is necessary to use an end capping catalyst which is disclosed to be preferably an amine such as di-n-hexylamine. It should be noted that while polyalkoxy silanes will condense or react with a silanol end-stopped polysiloxane polymer to end cap it, this reaction takes place very slowly or not at all without an end capping catalyst. This is even true where there is utilized one of the integrated cross-linkers scavengers of the foregoing White, et al, patent application, Ser. No. 277,524, U.S. Pat. No. 4,395,526, as well as those of the other patent applications above. However, even such basic end capping catalysts of the White, et al case are not as effective as would be desired. This is particularly true for instance in the one component alkoxy functional RTV system of Chung, et al, Ser. No. 428,038, entitled, *Novel Scavengers for One-Component RTV Compositions*, filed on the same date as the present case.

In Chung, et al, Ser. No. 428,038, there is disclosed a utilization of an alkoxy functional silazane integrated cross-linking agent scavenger. Such an integrated cross-linking agent, scavenger desirably needs a fast end-capping catalyst so that the integrated cross-linker scavenger may react with the silanol end-stopping diorganopolysiloxane polymer to end stop it to produce a shelf stable RTV polymer system. It has been found that the basic amine end capping catalysts are not very effective in such systems.

Accordingly, it is one object to provide for a shelf stable, fast curing, non-corrosive, alkoxy functional, one component RTV system.

It is another object of the present invention to provide for an efficient and rapid end-capping catalyst for reacting polyalkoxy silane and siloxane cross-linking agents with silanol containing polysiloxane polymers so as to end-cap the polymer with the polyalkoxy silane in an efficient manner.

It is an additional object of the present invention to provide a very efficient and rapid end-capping catalyst for integrated cross-linkers, scavengers which are reacted with silanol containing diorganopolysiloxane polymers to produce shelf stable, one component RTV systems.

It is yet still an additional object of the present invention to provide a process for producing a shelf stable, one component, alkoxy functional, RTV system by use of efficient end-capping catalysts for the reaction of polyalkoxy silane and siloxane cross-linking agents with silanol-containing organopolysiloxane polymers.

It is further still an additional object of the present invention to provide a process for producing a shelf stable, rapid curing, one component RTV system by providing an efficient end-capping catalyst for the reaction or end-capping of a silanol-containing organopolysiloxane polymer with an integrated cross-linker agent scavenger.

These and other objects of the present invention are accomplished by means of the disclosure set forth herein below.

SUMMARY OF THE INVENTION

In accordance with the above objects, there is provided by the present invention, a one-package substantially anhydrous room temperature vulcanizable organopolysiloxane composition, which is shelf stable and convertible to a tack-free elastomer, comprising: (1) an organopolysiloxane wherein the silicone atom at each polymer chain end is terminated with at least one hydroxy radical; (2) a polyalkoxy functional cross-linking agent; and (3) an end-capping catalyst selected from Lewis acids, Lowry-Brónsted acids and stearic acid treated calcium carbonate.

It should be noted that such a catalyst may not only be used in the end-capping of a silanol-containing organopolysiloxane with a polyalkoxy functional cross-linking agent, but may also be used for the end-capping of a silanol-containing organopolysiloxane with an integrated cross-linking agent, scavenger such as the ones disclosed in the foregoing patent applications or such as may be devised in the future. It has been found that the foregoing acids are much more effective as end capping catalyst in the end capping of a silanol containing organopolysiloxanes than are basic end capping catalysts such as the amines disclosed in the patent application of White, et al, Ser. No. 277,524, now U.S. Pat. No. 4,395,526, and elsewhere.

It should also be mentioned that the terms Lewis acids and Lowry-Brónsted acids are not meant to be exclusionary. That is, Lowry-Brónsted acids generally come within the definition of or the categorization of acids as defined by Lewis and as referred to as Lewis acids by some chemists. Basically, a Lowry-Brónsted acid is considered to be those classes of acids which are considered hypothetically to give up a proton when they react with other compounds. The Lewis definition of an acid is broader than the Lowry-Brónsted definition and is considered by some to cover all types of materials that have any type of acidic activity.

Accordingly, the use of these two terms in the specification and claims is not meant to be exclusionary but is meant to be supplementary, that is, one definition supplementing the other definition, to cover all types of acids within the limitation set forth below as end capping catalysts in accordance with the invention.

It should be noted that insofar as the acidity of the acid, it should have sufficient activity to promote the desired catalyzation reaction. It should not have too high an acidity so as to cause a rupture of the siloxane bonds or other bonds in the organopolysiloxane. Within these two limits, the acid may have any acidity which is desirable for one reaction or another. Further, included with the above acids as an end-capping catalyst, there is defined stearic acid treated calcium carbonate. It has been found at least with the alkoxy functional silazane integrated cross-linking agent, scavenger that such a treated calcium carbonate will catalyze the end-capping reaction. Such treated calcium carbonate has not been tried to determine whether it will catalyze the end-capping reaction with other types of integrated cross-linking agents, scavengers or with a polyalkoxy functional silane cross-linking agent.

However, it is hypothesized that such stearic acid treated calcium carbonate would also function as an end-capping catalyst because of the presence of the stearic acid, either with a poly-alkoxy functional cross-linking agent or any of the other integrated cross-linking agents, scavengers disclosed in the foregoing patent applications.

DESCRIPTION OF THE PREFERRED EMBODIMENT

As stated above, all kinds of acidic agents may be utilized as end-capping catalysts. By this invention, end capping catalyst, it is meant a catalyst that is utilized in the reaction between the silanol containing organopolysiloxane base polymer and either a polyalkoxy functional silane cross-linking agent or an integrated cross-linking agent, scavenger.

The broadest definition of such acidic agents is defined as a Lewis acid. A Lewis acid is generally defined to be a compound which is an electron accepter in a reaction with another compound. A more formal definition is to be found in the Van Nostrant Rheinhold Publishing Company, Condensed Chemical Dictionary, 8th Edition, Revised by G. G. Hawley (1971) in which a Lewis acid is defined as "any molecule or ion that can combine with another molecule or ion by forming a covalent chemical bond with two electrons from the second molecule or ion." Thus, any such Lewis acid can be utilized as an end-capping catalyst in the instant reaction.

A more limited definition of the types of acids that can be utilized in the instant invention is that which is known as a Lowry-Brónsted acid which in the foregoing Van Nostrant Rheinhold dictionary is defined by inference as a substance that can give up a proton to form a new compound with a covalent bond.

It should be noted that in this Specification and Claims, this definition of the types of acids that can be utilized in this instant invention are not mutually exclusive. That is, the Lowry-Brónsted definition is more in accordance with the traditional definition of acids and acidic agents that can be utilized as end capping catalysts in the invention, while the Lewis acid definition is a more general definition of the type of acidifying agents that can be utilized as end-capping catalysts in this invention.

As pointed out, these two definitions are not mutually exclusive, that is, the acids of one definition do not exclude the acids of the other definition, but as stated previously, the Lewis acid definition is a broader definition of the type of acidifying agents that can be utilized in instant invention as compared to the Lowry-Brönsted definition. Thus, while acidifying agents coming within the Lowry-Brönsted definition can be utilized in the instant invention, acidifying agents which are not within the Lowry-Brönsted definition but which are within the Lewis acid definition can be utilized as a catalyst in the present invention.

The third type of acidifying agent that has been found to work in the instant invention, is stearic acid treated calcium carbonate. As the Examples below will show, stearic acid treated calcium carbonate has been found to catalyze the end capping reaction of an alkoxy-functional silazane integrated cross-linker, scavenger in accordance with the present invention. It is postulated that this catalysis is due to the presence of the stearic acid in the stearic acid treated calcium carbonate. However, this is a hypothesis only. It is also postulated that because of this such a stearic acid calcium carbonate will also catalyze the end capping reaction of any other integrated cross-linking agent scavenger compound or even a polyalkoxy functional cross-linking agent such as a methyltrialkoxysilane and preferably methyltrimethoxysilane. However, again this is a hypothesis only.

Included among the acidifying agents that come within the above broad definition in addition to the stearic acid treated calcium carbonate, there are the traditional acid anhydrides, the traditional inorganic acids, the traditional silane acidifying agents, and the traditional organic acids. Further, within the broad definition given above, there is also included what is classified as Lewis acids such as aluminum chloride, etc. But before going into the definition of such acids, it is necessary to look at a few limitations on the use of such acifying agents in the end capping reaction.

First of all, the concentration of the acid that is utilized should be at least an effective amount necessary to promote the end-capping reaction. The concentration of the acidifying agent should not be so high as to cause or catalyze the rupture of any of the siloxane bonds in the silanol-containing organopolysiloxane that is to be end-capped. Another way of saying the same thing, preferably the acid number of the acidifying agent in the reaction medium is such that the acid number as determined by Silicone Products Division, General Electric Company, Waterford, N.Y., C-204 Test Method should be at least 0.1 and should not exceed 15.

Briefly, the C-204 Test Method consists of taking a 250 ml. flask and adding 100 ml. of isopropenol and 0.25 ml. of phenolphthalein indicator to the flask. The sample whose acid number is to be determined is then weighed and added to the flask. The resulting solution is then titrated with 0.1N KOH (solution in methanol) to the pink end point. The volume of KOH in methanol used in the titratium is recorded as $V_t$. The total acid number is then calculated from the following formula:

$$\text{Total Acid Number} = \frac{V_t(\text{NKOH})(56.1)}{\text{Sample wt.}}$$

Another way of saying the above is that the total acid number is the number of mg. of KOH to neutralize the free acid in one gram of the sample.

Generally, for most acidifying agents of the type disclosed above, this means that the concentration of the acid of acidifying agent should be within a range of 0.1 to 0.5 parts by weight per 100 parts of the silanol-containing organopolysiloxane. It should be noted that such acidifying agents as disclosed in the instant invention are such in most cases as to yield a rate of the end-capping reaction that is at times 5 to 10 times the rate than is experienced with the slower basic end-capping catalyst such as the amine catalyst. Nevertheless, in one embodiment of the instant invention, the rate of the acidifying agents when utilized as end-capping catalysts can be increased further by combining the acidifying agents with the traditional basic amine catalyst such as that disclosed in the White et al. patent application, Ser. No. 277,524.

All amines can be used as co-catalysts within the scope of the instant invention including primary, secondary and tertiary amines whether silyated or complexed in one fashion or another. The more basic the amine, the more effective it is as a catalyst. Examples of preferred amines that can be used within the scope of the instant invention are for instance:

$(Me_2N)_2-C=NC_3H_7Si(OCH_3)_3$
$(Me_2N)_2-C=NC_4H_9$
$H_2NC_3H_7Si(OEt)_3$
$H_2NC_3H_7Si(OCH_3)_3$
$H_2NC_3H_7NC_3H_7Si(OCH_3)_3$
Tetramethylpiperidine
Piperidine
1,4-Diazabicyclo[2.2.2]octane
N-Methylmorpholine
N,N-Dimethylethylenediamine
N-Methylpiperidine
N-hexylamine
Tributylamine
Dibutylamine
Cyclohexylamine
Di-n-hexylamine
Triethylamine
Benzylamine
Dipropylamine
N-ethylphenylamine Thus, primary, secondary, and silated secondary amine silanes can be utilized in combination with the acidifying agents of the present invention to further increase the rate of the end-capping over that which is accomplished by the acidifying end-capping catalysts by themselves. It should be noted that the foregoing primary, secondary and tertiary amines and the silated amines disclosed above are exemplary only and any type of such amines may be utilized in combination with the acidifying agent of the present invention as end-capping co-catalyst. Generally, such amines when they are utilized as end-capping catalyst are used in a concentration of anywhere from 0.1 to 0.5 parts by weight per 100 parts per weight of the silanol end-stop diorganopolysiloxane polymer that is to be end-capped. However, such use of a basic co-catalyst in combination with the acidifying catalyst of the instant case is optional and strictly unnecessary. They are only utilized when the integrated cross-linker scavenger reacts with great difficulty with the silanol-containing diorganopolysiloxane polymer. Thus, in many cases, the acidifying agents of the present invention will react and catalyze the end-capping reaction that is desired with sufficient efficiency. It should be especially noted with the foregoing alkoxy functional silazane integrated cross-linkers scavengers of Chung, et al., Docket 60Si-590, Ser. No. 428,038, that these acidifying agents will promote end-capping reaction with sufficient rapidity as compared to the amine catalysts that were utilized by themselves in the past. As a matter of fact, the foregoing alkoxy functional silazane integrated cross-linker scavenging agents of Docket 60Si-590 reacted only with difficulty or not at all to end-cap the silanol-containing organopolysiloxane base polymer with the use of solely basic amine end-capping catalysts.

On the other hand, the acidifying agents of the present case are good catalysts for promoting such reaction.

Proceeding now to the different types of acidifying agents encompassed by the present invention and more particularly to a particular type of Lowry-Brónsted acidifying agent such as acids anhydrides, the acid anhydrides preferably have the formula

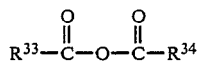  (1)

where $R^{33}$ and $R^{34}$ are $C_{1-20}$ monovalent hydrocarbon radicals. $R^{33}$ and $R^{34}$ can be any substituted or unsubstituted monovalent hydrocarbon radicals such as for instance, alkyl radicals, such as methyl, ethyl, propyl, etc., alkylene radicals such as vinyl, etc.; cycloalkyl radicals such as cyclohexyl, etc.; mono nuclear and bi-nuclear aryl radicals such as phenyl, methylphenyl, ethylphenyl, napthyl, methylnapthyl, etc., ether radicals such as methoxyethyl, ethoxyethyl, methoxymethyl; ester radicals such as carbmethoxymethyl, carbethoxymethyl, carbethoxyethyl and halo substituted monovalent hydrocarbon radicals such as 3,3,3 trifluoropropyl, preferably $R^{33}$ and $R^{34}$ are alkyl radicals, cycloalkyl radicals, or mono-nuclear aryl radicals of one to fifteen carbon atoms. Preferred anhydrides coming within the above definitions are as follows:
Acetic anhydride
Propionic anhydride
Butyric anhydride
Valeric anhydride
Caproic anhydride
Heptanoic anhydride
Octanoic anhydride
Decanoic anhydride
Dodecanoic anhydride
Myristic anhydride
Palmitic anhydride
Stearic anhydride
Oleic anhydride
Linoleic anhydride
Phenylacetic anhydride
Benzoic anhydride
Toluic anhydride
Maleic anhydride
Succinic anhydride
Chlorobenzoic anhydride Another type of Lowry-Bronsted acidifying agent that can be utilized as a co-catalyst in the instant invention is one of the formula

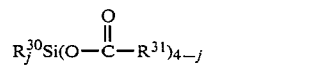  (2)

where $R^{30}$ and $R^{11}$ are $C_{(1-20)}$ monovalent hydrocarbon radicals and j is a whole number that varies from 0 to 3. The radicals $R^{30}$ and $R^{31}$ can be any of the monovalent hydrocarbon radicals substituted or unsubstituted previously identified for $R^{33}$ and $R^{34}$. Such a silane of Formula (2) above which yields an organic acid upon hydrolysis is extremely suitable as an acidifying endcapping catalyst in the instant reaction. Preferred acidifying silanes coming with the scope of Formula (2) are as follows:

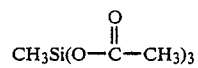

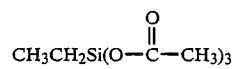

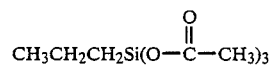

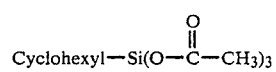

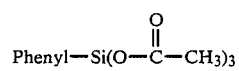

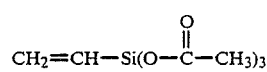

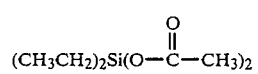

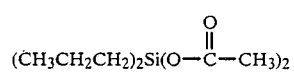

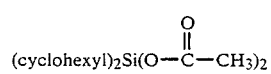

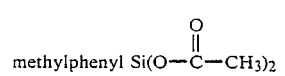

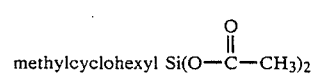

-continued

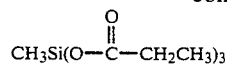

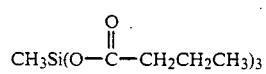

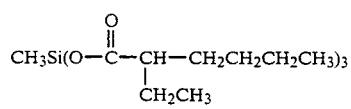

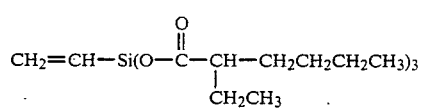

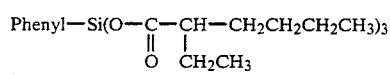

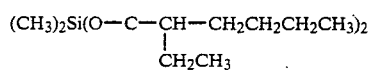

Within the scope of the Lowry-Brónsted definition of acids is, of course, both a strong and weak organic acid such as those which for simplicity can be represented by the following formula:

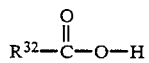 (3)

Formula 3 has been simplified for ease of representation. However, Formula (3), is meant to encompass any of the weak and strong organic acids which come within the Lowry-Brónsted definition of acidifying agents. Basically such $R^{32}$ can be any of the radicals previously given for $R^{33}$ and $R^{34}$ whether of any variation and type known in organic chemistry and meeting the Lowry-Brónsted definition of acidifying agents and can have anywhere from 0 to 20 carbon atoms. Preferred organic acids coming within the scope of Formula (3) above are as follows:
Formic acid
Acetic acid
Propionic acid
Butyric acid
Pentanoic acid
Hexanoic acid
Heptanoic acid
Octanoic acid
Nonanoic acid
Decanoic acid
Lauric acid
Myristic acid
Palmitic acid
Stearic acid
Oleic acid
Linoleic acid
Cyclohexanoic acid
Phenylacetic acid
Benzoic acid
Toluic acid
Succinic acid
Maleic acid
Fumaric acid
Methanesulfuric acid
Trichloroacetic acid
Trifluoroacetic acid
Phthalic acid Further, they can be utilized as end-capping catalysts in the instant invention inorganic acids coming within the Lowry-Brónsted definition of inorganic acidifying agents which can be any of the traditional known inorganic acidifying agents, such as, for instance, hydrochloric acid, phosphoric acid, sulfuric acid, nitric acid and polyphosphoric acids. Preferred acids coming within the foregoing definition of Lowry-Brónsted inorganic acids are:
Hydrochloric acid
Sulfuric acid
Phosphoric acid
Nitric acid
Polyphosphoric acid
Perchloric acid
Chloric acid
Iodic acid
Carbonic acid
Boric acid
Arsenic acid
Metaboric acid
Amido sulfuric acid
Amido phosphoric acid
Selenic acid
Selenious acid
Fluorosulfuric acid
Chlorosulfuric acid Finally, there can be used as end-capping catalysts, within the broad definition of acidifying agents mentioned previously which come within the Lewis definition of acidifying agents or which are traditionally referred to as Lewis acids, compounds such as, for instance, $AlCl_3$. Preferred Lewis acids which may be utilized in the instant invention are as follows:
$BaSO_4$
$BCl_3$
$BBr_3$
$BF_3(C_2H_5)_2O$
$BF_3 \cdot 2CH_3OH$
$BF_3 \cdot H_3PO_4$
$AlCl_3$
$AlCl_3 \cdot NOCl$
$Al_2O_3$
$Al(PO_3)_3$
$Al(OH)_2C_{16}H_{31}O_2$
$Al(C_2H_5)_3$
$Al(C_3H_7)_3$
$Al_2(SO_4)_3$
$Al(PO_4)$
$Al(C_7H_5O_3)_3$
$AlTl(SO_4)_2$
$TiC_2H_3O_2$
$TlBr_3$
$TlClO_3$
$TlClO_4$ Preferably such acidifying agents are used as end-capping catalysts in the present invention in the concentrations indicated previously. Preferably, and this is especially true with the inorganic acids, the acidifying agent must have the foregoing acid numbers in the reaction medium. This is especially true in connection with the maximum acid number. If the acid number is above the maximum limit indicated previously, then the acidifying agent may tend to catalyze the rupture of the siloxane bond either within the immediate reaction period or at subsequent times when the composition is formed and stored prior to being utilized; or, even in fact, when in some cases the siloxane elastomer is formed.

Accordingly, it is highly desirable that the maximum acid number indicated previously is not exceeded and generally should not exceed 15 and preferably should not exceed 5 as determined by the C-204 Method.

Any of the acidifying co-catalysts can be utilized as stated previously alone or in combination with one of the amine co-catalysts defined previously which are the amine end-capping catalysts of the prior art within the concentrations given previously and for the reasons given previously. However, as pointed out, in most cases this should not be necessary.

Further, as pointed out, for most end-capping reactions, the present acidifying agents are considerably more efficient than are the prior art basic amine catalysts. Now, proceeding to the reaction in which such acidifying catalysts are utilized, such acidifying catalysts are utilized in any of the compositions and reactions discussed in the background of the invention with respect to alkoxy functional one-component RTV compositions in which the object is to end-cap a silanol-containing organopolysiloxane polymer and more preferably a silanol terminated polymer with either a polyalkoxy functional silane or one of the alkoxy containing integrated cross-linkers, scavengers of the foregoing patent applications, and particularly those disclosed in the patent application of White et al, Ser. No. 277,524, now U.S. Pat. No. 4,395,526, and disclosed in the patent application of Dziark, Ser. No. 349,695, now U.S. Pat. No. 4,417,042 and the patent application of Chung et al, Ser. No. 428,038, filed on the same date as the present case.

It must be pointed out that the end capping reaction is the one in which the polyalkoxy terminated diorganopolysiloxane polymer is first formed in accordance with the disclosure of the White et al patent applications to which at that time or subsequent to that time, is added a scavenger which will act to tie up all free hydroxy groups in the RTV polymer composition so as to preserve the shelf stability of the composition. In a most preferable form, the present end capping catalyst is utilized in the reaction of a polyalkoxy functional silane of Formula (7) below which is the formula of a cross-linking agent that is more preferably utilized to produce the end-capped polymer, which is reacted with the base silanol containing diorganopolysiloxane polymer, to form a polyalkoxy terminated diorganopolysiloxane base polymer to which is added a scavenger in accordance with the White et al. patent application, Ser. No. 277,524, now U.S. Pat. No. 4,395,526. It is desirable to first form a polyalkoxy terminated diorganopolysiloxane polymer, with the use of a polyalkoxy functional silane of Fromula (7) below or by the use of integrated cross-linker scavenger. This is the most preferable route in forming the RTV polymer compositions of the instant case. To facilitate and increase the efficiency of the end-capping reaction, it is desirable to utilize one of the end capping acid catalysts of the instant case. Without such end capping catalysts, either a basic catalyst or an acid catalyst, the polyalkoxy functional silane of Formula (7) below will react with a silanol containing organopolysiloxane only very slowly if at all. Accordingly, in order to commercialize this reaction and to speed up the manufacturing process, and in the interests of economy, it is highly desirable to use an end capping catalyst. The most efficient end capping catalysts for such reactions, that is of the polyalkoxy functional silane cross-linking agent of Formula (7) below, or any of the integrated cross-linkers scavengers and the silanol terminated diorganopolysiloxane polymer of Formula (4) is the end capping catalysts of the instant case. Such is especially desirable in the case when the end capped polymer is first formed before the scavenger is added to the RTV system such as disclosed in the patent application of Dziark, Ser. No. 349,695, now U.S. Pat. No. 4,417,042 and Chung, et al, Ser. No. 428,038, filed on the same date as the present case.

Further, where the silanol terminated diorganopolysiloxane polymer of Formula (4) is end-capped with a combination of an integrated cross-linker scavenger such as disclosed in the foregoing patent application of Chung, et al, Ser. No. 428,038 it is necessary again to utilize one of the acidifying end-capping catalysts of the instant case to promote the end-capping of the silanol terminated diorganopolysiloxane polymer of Formula (4) in an as efficient manner as possible.

Accordingly, we will now proceed to a description of the preferred RTV systems in which the acidifying catalysts of the instant case may be used to form an end capped polymer. It should be understood that these catalysts generally may be used in any end capping reaction between an alkoxy functional silane and a silanol-containing organopolysiloxane polymer.

The silanol-terminated polydiorganosiloxane has the formula,

(4)

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500.

As utilized hereinafter, the term "stable" as applied to the one package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

Stable, substantially acid-free, one-package, moisture curable polyalkoxy-terminated organopolysiloxane RTV compositions can be made by using a silanol terminated polydiorganosiloxane consisting essentially of chemically combined diorganosiloxy units of the formula

such as a silanol-terminated polydiorganosiloxane of formula (4), where R is as previously defined, with an effective amount of certain silane scavengers for chemically combined hydroxy radicals. In the silanolterminated polydiorganosiloxane consisting essentially of chemically combined Formula (5) units, the presence of silicon bonded $C_{(1-8)}$ alkoxy radicals such as methoxy radical is not precluded. The hydroxy radicals which can be removed by the silane scavenger can be found in materials normally present in the RTV composition of the present invention, for example, trace amounts of water, methanol, silcanol radicals on the silica filler (if used), the silanol polymer of Formula (4), or a silanol-terminated polymer having Formula (5) units. The silane scavenger useful for eliminating chemically combined hydroxy radicals in accordance with the practice of the invention preferably has the formula

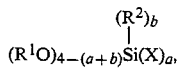

where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and defined more particularly below, X is a hydrolyzable leaving group selected from amido, amino, carbamato, enoxy, imidato, isocyanato, oximato, thioisocyanato, and ureido radicals. The preferred members are amino, amido, enoxy, and the more preferred is amido, for example, N—$C_{(1-8)}$ alkyl $C_{(1-8)}$ acylamido, a is an integer equal to 1 or 2 and preferably 1, b is a whole number equal to 0 or 1 and the sum of a+b is equal to 1 or 2. In Formula (6), where a is 2, X can be the same or different. The leaving group X reacts preferentially before —$OR^1$ with available —OH in the RTV composition and provides an RTV composition substantially free of halogen acid, or carboxylic acid. The silane scavenger of Formula (6) is both the silane scavenger for hydroxy functional groups and a polyalkoxysilane cross-linking agent for terminating the silicon atom at each organopolysiloxane chain-end with at least two alkoxy radicals.

Among the ingredients of the RTV compositions which are formed as a result of the use of the hydroxy scavenger of Formula (6), is silanol-free polydiorganosiloxane, chain-terminated with two or three —$OR^1$ radicals. The silanol-free polydiorganosiloxane optionally can be combined with an effective amount of a cross-linking silane, as defined hereinafter, under substantially anhydrous conditions. The cross-linking polyalkoxysilane which can be utilized in combination with the scavenging silane of Formula (6) has the formula

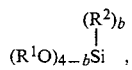

where $R^1$, $R^2$ and b are as previously defined. The preferred condensation catalysts which can be used in the practice of the invention include metal compounds se-lected from tin compounds, zirconium compounds, and titanium compounds or mixtures thereof. Additional condensation catalysts which can be used are defined more particularly hereinafter.

It is not completely understood why the polyalkoxyterminated organopolysiloxane compositions of the present invention are stable in the presence of certain condensation catalysts over an extended period of time in the substantial absence of moisture.

A mechanistic study of the RTV of the present invention supports the theory that the use of scavenging silane of Formula (6) or (8) below or in combinations thereof with crosslinking silane of Formula (7), in accordance with the practice of the invention, minimize the likelihood that detrimental amounts of $R^1OH$ will be generated during the shelf period. $R^1OH$ generation is to be avoided because $R^1OH$ endstops the silanol polymer of Formula (4) or polymer with Formula (5) units to produce polymers having terminal

units. These polymers, wherein the silicon atom at each polymer chain end is terminated with only one alkoxy radical, have slow cure times. In addition, $R^1OH$ can breakdown the organopolysiloxane polymer in the presence of the condensation catalyst.

The use of the silane scavenger for hydroxy of Formulas (6), in which the leaving group X is not a halogen radical, substantially eliminates undesirable water in the filler and silicone polymer, as well as residual moisture in the RTV composition during the shelf period. In determining what level of silane scavenger of Formula (6) to use in the practice of the invention, the total hydroxy functionality of the RTV composition can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3% by weight, based on the weight of the polymer. The aforementioned 3% of scavenger by weight exceeds that amount required to substantially eliminate available hydroxy functionality in the polymer as a result of reaction between OH functionality and X radicals. In compositions which also contain filler and other additives, the additional amount of scavenger which is required is estimated by running a 48 hour stability check at 100° C. to determine whether the tack-free time remains substantially unchanged as compared to the tack-free time of the composition before aging measured under substantially the same conditions.

Where polyalkoxy-terminated polymer of Formula (9) below is made without using silane scavenger of Formula (6), silane scavenger can be used in the practice of the invention having less than two —$OR^1$ radicals attached to silicon, as shown by the formula,

where $R^1$, $R^2$, and X are as previously defined, c is a whole number equal to 0 to 3 inclusive, d is an integer equal to 1 to 4 inclusive, and the sum of (c+d) is equal to 3 or 4. In such situations, the scavenging silanes of Formula (8) can be used in an amount sufficient to stabilize the RTV composition as previously defined for the scavenging silane of Formula (6). In addition, there can be used with scavengers of Formulas (6) or (8) at least 0.01 part and up to 10 parts of the cross-linking silane of Formula (7).

The polyalkoxy-terminated organopolysiloxane may have the formula,

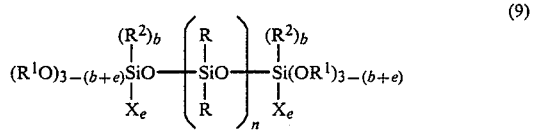

where R, $R^1$, $R^2$, X, n and b are as previously defined and e is equal to 0 to 1 and the sum of b+e is equal to 0 to 1. The polyalkoxy-terminated organopolysiloxane of Formula (9) is preferably made by the process of the present invention.

In Formulas (4–9), R is preferably selected from $C_{(1-13)}$ monovalent hydrocarbon radicals, halogenated hydrocarbon radicals and cyano alkyl radicals, $R^1$ is preferably a $C_{(1-8)}$ alkyl radical or a $C_{(7-13)}$ aralkyl radical, $R^2$ is preferably methyl, phenyl, or vinyl.

The expression "substantially acid-free" with respect to defining the elastomer made from the RTV composition of the present invention upon exposure to atmospheric moisture means yielding byproducts having a pKa of 5.5 or greater with 6 or greater preferred and 10 or greater being particularly preferred.

It has been further found that improved cure rates can be achieved if minor amounts of amines, substituted guanidines, or mixtures thereof, are utilized as curing accelerators in the polyalkoxy compositions of the present invention. There can be used from 0.1 to 5 parts, and preferably from about 0.3 to 1 part of curing accelerator, per 100 parts of the silanol-terminated polymer of Formula (4), or which consists of chemically combined units of Formula (5), or 100 parts of the polyalkoxy-terminated polymer of Formula (9) to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

It appears that the curing accelerators described herein, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, i.e. less than about 30 minutes which remains substantially unchanged after accelerated aging.

The RTV compositions of the present invention can cure to a depth of ⅛" thickness within 24 hours. Durometer Hardness (Shore A) can then be determined and used to evaluate the cure of the compositions as shown in the examples.

A scavenging silane of the formula

can be used in the RTV composition of this case where $R^1$, $R^2$, X and c are as previously defined, f is an integer equal to 1 to 4 inclusive, and the sum of c+f is equal to 1 to 4 inclusive. In addition, an effective amount of a curing accelerator selected from substituted guanidines, amines and mixtures thereof is used.

In a further aspect, there is provided a stable room temperature vulcanizable polyalkoxy-terminated organopolysiloxane composition curable under ambient conditions to a tack-free, substantially acid-free elastomer comprising:

(A) 100 parts of a polyalkoxy-terminated organopolysiloxane of Formula (9)

(B) 0 to 10 parts of a cross-linking silane of Formula (7)

(C) an effective amount of condensation catalyst, and (D) a stabilizing amount of scavenging silane.

Also included within the present invention is a method of making a room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises (1) adding to the silanol-terminated organopolysiloxane a stabilizing amount of a polyalkoxysilane which is both a scavenger for hydroxy functional groups and a cross-linking agent of the formula

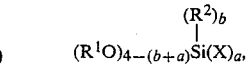

where $R^1$, $R^2$, X, a and b are as previously defined, in the presence of end-capping catalyst of the present case, and thereafter adding an effective amount of a condensation catalyst, whereby improved stability is achieved in the resulting room temperature vulcanizable organopolysiloxane composition.

There is further defined a room temperature vulcanizable organopolysiloxane composition under substantially anhydrous conditions utilizing an effective amount of condensation catalyst with an organopolysiloxane wherein the silicon atom at each polymer chain end is terminated withat least two alkoxy radicals, which involves the improvement which comprises adding to said polyalkoxy-terminated organopolysiloxane a stabilizing amount of a silane scavenger for hydroxy functional groups of the formula,

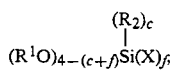

where $R^1$, $R^2$, X, c and f are as previously defined and an effective amount of a condensation catalyst, whereby improved stability is achieved in the resulting room temperature vulcanizable organopolysiloxane composition.

In an additional aspect, there is provided a method of making a stable, one-package room temperature vulcanizable polyalkoxy-terminated organopolysiloxane composition which comprises agitating, under substantially anhydrous conditions, a room temperature vulcanizable material selected from
 (i) a mixture comprising on a weight basis
  (a) 100 parts of a silanol-terminated polydiorganosiloxane consisting essentially of chemically combined units of Formula (5).
  (b) an amount of silane of Formula (6) sufficient to scavenge available —OH in the RTV composition and provide up to 3% by weight excess, based on the weight of RTV composition;
  (c) 0 to 10 parts of the cross-linking silane of Formula (7),
  (d) an effective amount of a condensation catalyst, and
  (e) 0 to 5 parts of curing accelerator selected from substituted guanidines, amines and mixtures thereof wherein, the condensation catalyst is added after the silanol-terminated polydiorganosiloxane and scavenging silane are mixed; and
 (ii) a mixture comprising,
  (a) 100 parts of the polyalkoxy-terminated organopolysiloxane of Formula (9)
  (b) 0 to 10 parts of the cross-linking silane of Formula (7)
  (c) an effective amount of a condensation catalyst,
  (d) a stabilizing amount of silane scavenger of Formula (10), and
  (e) 0 to 5 parts of curing acclerator selected from substituted guanidines, amines and mixtures thereof.

Radicals included within R of Formulas (4), (5) and (9) are, for example, aryl radicals and halogenated aryl radicals, such as phenyl, tolyl, chlorophenyl, naphthyl, aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals.

Some of the cross-linking polyalkoxysilanes included within Formula (7) are, for example, methyltrimethoxysilane; methyltriethoxysilane; ethyltrimethoxysilane; tetraethoxysilane; vinyltrimethoxysilane; etc.

Among the curing accelerators which can be used in the practice of the invention are silyl substituted guanidines having the formula,

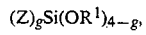

where $R^1$ is as previously defined, Z is a guanidine radical of the formula,

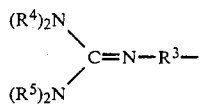

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula,

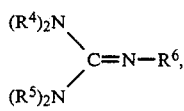

where $R^4$ and $R^5$ are as previously defined and $R^6$ is a $C_{(1-8)}$alkyl radical, also can be employed. Some of the silyl substituted guanidines included within Formula (11) are shown by Takago, U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, γ-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of Formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition, betadicarbonyltitanium compounds as shown by Weyenberg, U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate.

Examples of nonmetal condensation catalysts are hexylammonium acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate, etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from about 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

As used hereinafter, the expressions "moisture free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Experience has shown that sufficient scavenging silane of Formula (6) should be utilized as previously defined. Temperatures can vary from about 0° C. to about 180° C. depending upon the degree of blending, the type and amount of filler.

A procedure for making the RTV composition of the present invention is to agitate under substantially anhydrous conditions, a mixture of the silanol terminated polydiorganosiloxane, filler and an effective amount of the scavenging silane of Formula (6) sufficient to effect the substantial elimination of hydroxy functional radicals and to end cap the polymer. This "end-capping" and scavenging procedure can require several minutes, hours, or even days, depending upon such factors as the nature of the X leaving group, the number of —OR¹ radicals on the scavenging silane, etc. There then can be added to the substantially silanol-free mixture, the condensation catalyst, the cross-linking silane, or mixture thereof, along with other ingredients, for example, the curing accelerator and pigments. A stabilizing excess of the scavenging silane can be used in the initial or final stages of the mixing procedure if desired in amounts previously defined.

In conformity with Dziark, Ser. No. 349,695 the end capped polyalkoxy polysiloxane may be produced according to the instant invention. A room temperature vulcanizable organopolysiloxane composition is produced having: (1) an organopolysiloxane wherein the silicon atom at each polymer chain end is terminated with at least 2 alkoxy radicals; (2) an effective amount of a condensation catalyst; (3) a stabilizing amount of silane scavenger for hydroxy functional groups which is selected from a silicon-nitrogen compound selected from the class consisting of (A) a silicon-nitrogen compound having the formula

where Y is selected from R''' and $R_2''N—$ and, (B) a silicon-nitrogen polymer comprising (1) from 3 to 100 mole percent chemically combined structural units selected from the class consisting of units having

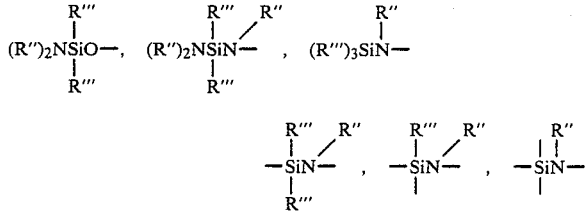

and (2) from 0 to 97 mole percent chemically combined structural units represented by the formula

and mixtures thereof where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazane unit are joined to a member selected from an R''' radical and $(R'')_2N$ radical, and where the ratio of the sum of said R''' radicals and said $(R'')_2N$ radicals to the silicon atoms of said silicon-nitrogen polymer has a value of 1.5 to 3, inclusive R'' is a member selected from the class consisting of hydrogen and $C_{(1-12)}$ monovalent hydrocarbon radicals, and fluoroalkyl radicals, R''' is a member selected from hydrogen, monovalent hydrocarbon radicals and fluoroalkyl radicals, and c is a whole number equal to 0 to 3, inclusive, and optionally (4) an effective amount of a curing accelerator selected from the group consisting of substituted guanidines, amines and mixtures thereof.

The most preferred compound within the scope of the formula of the silicon-nitrogen compound is a silazane and more particularly hexamethyldisilazane. Other compounds within the scope of the formula may be utilized as scavengers in the instant case such as hydrogen-containing amines, as will be explained below.

There is envisioned within the present invention that such scavengers are not mixed cross-linking agents scavenger compounds, but rather there is utilized a separate cross-linker and the silyl-nitrogen material is a separate compound which is added to that composition. Such scavengers may be utilized to prepare the composition in a number of ways as disclosed in White et al., Ser. No. 277,524, now U.S. Pat. No. 4,395,526, that is, all the ingredients may be mixed together at the same time with the scavenger mixed in along with the other ingredients or the polyalkoxy-terminated polymer may be prepared first and then the scavenger and other ingredients added. The latter method is the preferred method of the instant case since it has been found that it yields the composition that is more shelf stable and has better curing properties. Thus in the preferred embodiment of the instant case, there is first added the cross-linking agent to the silanol-terminated diorganopolysiloxane polymer in the presence of a condensation catalyst. The preferred condensation catalyst for this purpose is one of the acidifying catalysts of the present case.

Once the polyalkoxy-terminated polymer is formed, then the scavenger is added, that is, one of the silicon-nitrogen compounds disclosed above to absorb all unendcapped hydroxyl groups. Then all the other ingredients may be added into the composition whereupon the scavenger will absorb the free hydroxy groups from such materials also. As a result of the preparation of the composition in this manner, there will be prepared a composition which is substantially free of free hydroxy groups and as a result is shelf-stable and fast-curing; by shelf stable it is meant that it will have a rate of cure and degree of cure which is about the same six months or one year after it has been manufactured as it was after its manufacture and preparation.

In the above formulas of the silicon-nitrogen compound and silicon-nitrogen polymer, the R″ and R‴ radicals may be selected from hydrogen and any monovalent hydrocarbon radicals including fluoroalkyl radicals. Examples of the radicals from which the R″ and R‴ can be selected are, for instance, alkyl radicals such as methyl, ethyl, propyl, etc.: cycloalkyl radicals such as cyclohexyl, cycloheptyl, etc.; mononuclear aryl radicals such as phenyl, methylphenyl, ethylphenyl, etc.; alkenyl radicals such as vinyl, allyl, etc.; fluoroalkyl radicals such as 3,3,3,trifluoropropyl. Generally, the R″ and R‴ radicals may have from 1 to 12 carbon atoms and more preferably the radicals may have from 1 to 8 carbon atoms.

In addition to the above described silicon-nitrogen materials, there are also included in the present invention, silicon-nitrogen materials having divalent hydrocarbon radicals attached to silicon atoms through silicon-carbon linkages. For example, also included among the silicon-nitrogen materials that can be employed in the practice of the invention, are arylenesilazanes, such as phenylene silazanes, and alkylenesilazanes such as methylenesilazanes. In addition, various other silicon-nitrogen materials, containing divalent hydrocarbon radicals are also contemplated including copolymers and terpolymers such as silicon-nitrogen materials containing intercondensed siloxane units and silarylenesilazane units, intercondensed silazane units, silarylenesiloxand units, and siloxane units, etc. The silicon-nitrogen polymers in the form of silazane/siloxane copolymers having at least 3 mole percent of chemically combined silazy units and up to 97 mole percent of combined siloxy units.

Accordingly, the silazane polymers can include cyclics consisting of chemically-combined

units where R″ and R‴ are as previously defined to provide for a ratio of 1.5 to 3.0 of the sum of the R‴ and R₂″N radicals for silicon atoms in the silazane polymer.

The definition of a silazane polymer includes linear polymers having at least one unit selected from the class consisting of

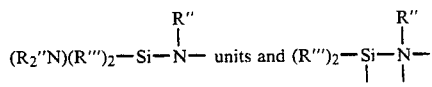

where R″ and R‴ are as previously defined to provide for a ratio of 1.5 to 3 of the sum of the R‴ and R₂″N radicals per silicon atoms in the silazane polymer.

Further silazane polymers which are included within the definition of the above polymers comprise linear polymers consisting essentially of

units where R″ and R‴ are defined to provide for a ratio of 1.5 to 3.0 of the sum of the R‴ and R₂″N radicals per silicon atom in the silazane polymer.

In addition, the silazane polymers include polymers having at least one unit selected from the class consisting of

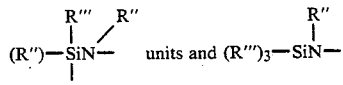

where R″ and R‴ are as previously defined to provide a ratio of 1.5 to 3 of the sum of the R‴ and R₂″N radicals per silicon atom in the silazane polymer.

In addition the silazane polymers can comprise polymers having a sufficient amount of units selected from

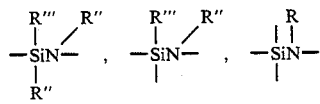

where R″ and R‴ are as previously defined to provide for a ratio of 1.5 to 3 of the sum of the R‴ and R₂″N radicals per silicon atom in the silazane polymer.

The silazane/siloxane copolymers can also be in the form of cyclics and consist of chemically combined R₂‴SiO units and

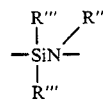

units where R″ and R‴ are as previously defined.

Linear silazane-siloxane copolymers are also included where the mole percent of $$(R''')_cSiO_{\frac{4-c}{2}}$$

units can be as high as 97 mole percent with the balance of the units being selected from

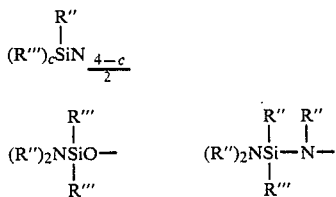

where R'' and R''' are as previously defined to provide for a ratio of the sum of R'''+R$_2$''N radicals per silicon of the silazane-siloxane copolymer from 1.5 to 3.

Other linear silazanes that are included within the scope of the formula above are ones having the formula

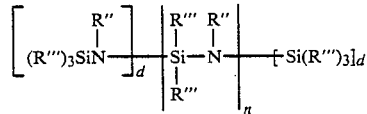

where R'' and R''' are as previously defined, n is a positive whole number and is preferably from 0 to 20 inclusive, and d is a whole number equal to 0 to 1 inclusive and where d is equal to 0 and n is preferably equal to 3 to 7, inclusive.

Illustrating the silazanes that can be employed in the practice of the present invention within the scope of the above formulas are hexamethylcyclotrisilazane, octamethylcyclotetrasilazane, trimethyltriphenylcyclotrisilazane, trivinyltrimethylcyclotrisilazane, etc.

In addition to the silazanes of the above formulas, there is also included polysiloxanes having terminal silylamine units or silazane units as shown by the formula

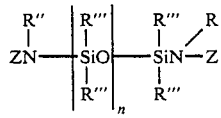

where R'' and R''' are as defined previously, Z is a member selected from R'' and SiR$_3$''', where R'' and R''' and n are as defined previously. The polysiloxane compounds of the above formula may be prepared by taking ammonia or an amine and reacting it at a temperature within the range of between about 0° to 60° C. with a halogenated polysiloxane having the formula

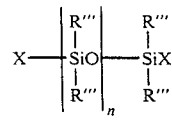

where R''' and n are as defined above and X is a halogen radical such as chloro or bromo. If a terminal silazane radical is desired, for example, a molar amount of (R''')$_3$SiX can be reacted along with the halogenated polysiloxane, at least equivalent to the moles of halogen radicals contained therein. It will, of course, be appreciated that amines of the formula

H$_2$NR'' are utilized for forming the silazane chain-stopped polysiloxanes of the invention where R'' is as defined above, while in the case when materials are desired having terminal silyl amine radicals, amines, includes amines of the above formula can be employed having at least one hydrogen available for reaction to produce the desired polysiloxane.

The halogen chain-stopped polydiorganosiloxanes of the above formula can be made by conventional procedures such as by the controlled hydrolysis of a diorganodihalosilane, for example, dimethyldichlorosilane as taught in Patnode U.S. Pat. No. 2,381,366 and Hyde U.S. Pat. Nos. 2,262,726 and 2,902,507. Another procedure that can be employed involves equilibrating a mixture of a diorganodichlorosilane and a cyclic polydiorganosiloxane in the presence of a metal catalyst such as ferric chloride as shown in Sauer U.S. Pat. No. 2,421,653. Although the various procedures utilized in forming the above polysiloxanes are not critical, generally it has been found desirable to maintain the halogen content of the resulting chain-stopped polysiloxane in the range of about 0.4 to about 35 percent, by weight, and preferably from about 5 to about 20 percent by weight. The halogen chain-stopped polysiloxane is preferably in the form of a chlorinated chain-stopped polydimethylsiloxane.

Included among the amines which can be employed with the halogenated polysiloxanes are ammonia, methyl amine, aniline, dimethyl amine, ethylphenyl amine, methylethyl amine, etc.

The process for producing the rest of the silazane compounds and silazane polymers is well known to a worker skilled in the art.

Typical of the methods that can be employed to make the materials that can be used in the present invention include the method shown by R. O. Sauer, et al., J.A.C.S., Vol. 68, 1946, p 241–44, and in U.S. Pat. Nos. 2,462,635-Haber, 2,885,370-Groszos et al., 2,579,416, 2,579,417 and 2,579,418-Cheronis. Examples of the polymers contained intercondensed siloxane and silazane units, and polysiloxanes terminated by silyl amine units that are operable in the present invention are shown in U.S. Pat. Nos. 2,503,919-Patnode, and 2,865,918-Hurwitz et al. Some of the silyl amines that can be employed in the practice of the invention are shown in U.S. Pat. Nos. 2,429,883-Johannson, 2,807,635-Breedervelt et al., and 2,758,127-Goldschmidt et al., etc.

Accordingly, the process for producing such polymers and compounds is well known.

Fluoroalkyl-substituted silazane compounds can also be prepared by a similar method as disclosed in the patent application of Matsomoto, Ser. No. 195,579 filed on Oct. 8, 1980.

The existence of such silyl-nitrogen compounds and silyl-nitrogen polymers as well as their methods of preparation is disclosed in U.S. Pat. No. 3,243,404 to which a worker skilled in the art can refer to for more information.

In addition to the foregoing silyl-nitrogen compounds and silyl-nitrogen polymers disclosed above, there can also be utilized in the instant invention scavengers which are silyl amines of the formula

where $R^{20}$ is a radical selected from the class consisting of $C_{(1-8)}$ monovalent hydrocarbon radicals and $C_{(1-8)}$ alkoxy radicals and fluoralkyl radicals, and $R''$ is selected from hydrogen and a $C_{(1-8)}$ monovalent hydrocarbon radical, and g is a whole number that varies from 1 to 3, h is a whole number that varies from 0 to 2 and the sum of h+g does not exceed 3. Compounds coming within the scope of the above formula are, for instance, methyl, di(methylamino)silane, tris(methylamino)silane, methyl bis(diethylamino)silane as well as the following:
tris(diethylamino)silane
methylbis(dimethylamino)silane
tri(ethylamino)silane
ethyl di(methylamino)silane
ethyl di(ethylamino)silane
ethyl bis(dimethylamino)silane Such amines are disclosed in U.S. Pat. No. 3,243,404 and can be produced by the methods disclosed in that patent. The silyl-nitrogen compounds and polymers are the most preferred in the instant compositions as scavengers, then the above amines can also be utilized as scavengers in the RTV composition of the instant case. The only difficulty with the hydride amines is that they do tend to liberate hydrogen upon standing and also they tend to impart the undesirable odor of amines to the RTV composition. However, if this is not a problem, then they can be tolerated in the instant composition. Preferably, the silyl-nitrogen compounds such as hexamethyldisilazane and the rest, are utilized in a concentration of 0.5 to 10 parts by weight per 100 parts of the base organopolysiloxane polymer.

Accordingly, the preferred silyl-nitrogen compounds and polymers within the scope of the above formulas may be utilized in the instant invention. As stated previously, generally, preferably from 0.5 to 10 parts of the scavenger is used per 100 parts by weight of either the silanol base polymer or the polyalkoxy base polymer. Whether the base polymer is silanol-stopped or polyalkoxy-stopped as will be explained below, makes little difference in the concentration of the scavenger since the molecular weight of both compounds is approximately the same. More generally, the scavenger may be utilized in a concentration of 1 part to any concentration that is desired. It is not desirable to add too much of the scavenger since about 10 parts may detract from the cured physical properties of the composition. As will be explained below, it is generally desired to have at least 3% excess of the scavenger in the composition, that is, 3% excess over the amount necessary to absorb or endcap all the free hydroxy groups in the composition. The compositions with which the above scavengers may be utilized, are varied but are specifically disclosed above and below, as well as in Lucas et al., Ser. No. 349,538, Feb. 17, 1982; Beers, now U.S. Pat. No. 4,483,973 Ser. No. 349,537, Feb. 17, 1982, and elsewhere.

For more information as to these silazane scavengers as used in a one-component alkoxy-functional RTV system, the worker skilled in the art is referred to the patent application of Dziark, Ser. No. 349,695.

Further, in accordance with Chung, et al., Ser. No. 428,038 there is also provided by the present invention, a stable one-package, substantially anhydrous and substantially acid-free, room temperature, vulcanizable, organopolysiloxane composition, stable under ambient conditions, in the substantially absence of moisture over an extended period of time, and convertible to a tack-free elastomer comprising:

(A) an organopolysiloxane wherein the silicon atom at each polymer chain end is terminated with at least 2 hydroxy or alkoxy radicals;

(B) an effective amount of a condensation catalyst;

(C) a stabilizing amount of scavenger for hydroxy functional groups selected from the class consisting of a non-cyclic silyl nitrogen scavenger of the formula,

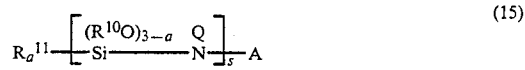

and cyclic silyl nitrogen scavengers having at least one or all of the units of the formula,

and the rest of the units, if any, having the formula

where $R^{10}$ is a $C_{1-8}$ aliphatic organic radical selected from the group consisting of alkyl, alkylether, alkylester, alkylketone, alkylcyano, and aryl, $R^{11}$ is a $C_{1-8}$ monovalent substituted or unsubstituted hydrocarbon radical Q is selected from hydrogen, $C_{1-8}$ monovalent substituted or unsubstituted hydrocarbon radicals and radicals of the formula

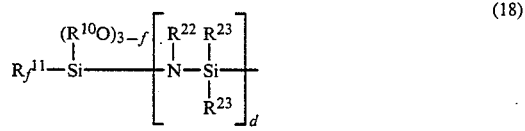

where $R^{10}$, $R^{11}$ are as previously defined, where a varies from 0 to 2 where f varies from 0 to 3, h is 0 or 1, where s is a whole number that varies from 1 to 25, d is a whole number that varies from 1 to 25, $R^{22}$ is selected from hydrogen and $C_{1-8}$ monovalent hydrocarbon radical and $R^{23}$ is independently selected from monovalent hydrocarbon and hydrocarbonoxy radicals. A is selected from the class consisting of hydrogen and $C_{1-8}$ monovalent substituted or unsubstituted hydrocarbon radicals and a radical of the formula

where $R^{10}$, $R^{11}$ are as previously defined, g varies from 0 to 3 and in the above scavengers, there is at least one hydrocarbonoxy group in the molecule, $R^{12}$ as defined the same as $R^{10}$ and $R^{13}$ is defined the same as $R^{11}$, and $R^{14}$ is defined the same as $R^{11}$, and optionally, (D) an effective amount of a curing accelerator selected from the group consisting of substituted guanidines, amines, and mixtures thereof.

In the case when it is desired to have an integrated cross-linker scavenger compound in the RTV system, and s=1 and d=1, the same compounds as disclosed above may be utilized; except in such compounds there are at least three and preferably four alkoxy groups or hydrocarbonoxy groups in the linear, or cyclic silazane compound or one alkoxy group on each silicon atom for a cyclic compound. In the case s and d are greater than one, then preferably there are at least two hydrocarbonoxy groups on the terminal silicon atoms and one hydrocarbonxy group on each internal silicon atom; although generally some compounds or polymer species can still function as integrated cross-linkers having some silicon atoms with no hydrocarbonoxy groups. Two or one alkoxy groups in the compound result in it acting effectively as a scavenger, but unfortunately, it does not have sufficient alkoxy functionality for it to impart to the composition necessary cross-linking capabilities. Further, these alkoxy compounds can also be made by the traditional processes disclosed in the present case or as disclosed in Dziark, Ser. No. 349,695, filed Feb. 17, 1982, now U.S. Pat. No. 4,417,042, referred to previously.

In the formula of the linear or branchchained, noncyclic, silyl nitrogen scavenger, the radical $R^{10}$ can be selected from radicals such as alkyl radicals, such as methyl, ethyl, propyl, etc.; alkylether radicals such as methylmethylether, methylethylether, methyl propylether, ethylethylether, ethyl propylether, 2-methoxyethyl, 2-ethoxyethyl, 2-propoxymethyl, etc.; alkylester radicals such as methyl ester, ethyl ester, propyl ester, butyl ester, 2-acetoxyethyl, 2-acetoxypropyl, etc.; alkylketone radicals such as 1-butan-3-only, methyl methyl ketone, methyl ethyl ketone, ethyl methyl ketone, ethyl ethyl ketone, etc.; and alkylcyano radicals such as methyl nitrile; and aryl radicals such as phenyl, methyl phenyl, etc. Basically, the $R^{10}$ radical can be any alkyl and phenyl radical of 1-8 carbon atoms, and more preferably one of the radicals disclosed above. Most preferably, $R^{10}$ is selected from methyl. In the compound of Formula (15), $R^{11}$ is generally from a $C_{1-8}$ monovalent substituted or unsubstituted hydrocarbon radical such as an alkyl radical such as methyl, ethyl, propyl, etc.; a cycloalkyl radical such as cyclohexyl, cycloheptyl, etc.; an olefinic radical such as vinyl, allyl, etc.; a mononuclear aryl radical such as phenyl, methylphenyl, ethylphenyl, etc.; or a substituted hydrocarbon radical such as fluoroalkyl radical, such as 3,3,3-trifluoropropyl. The radical $R^{23}$ is independently selected from the same radical as $R^{11}$ and further $C_{1-8}$ hydrocarbonoxy radicals. Further, $R^{22}$ is selected from hydrogen and the same radicals as $R^{11}$.

Accordingly, preferably $R^{11}$ is selected from an alkyl radical of 1-8 carbon atoms and is most preferably selected from hydrogen. Alternatively, the radical Q can be selected from any $C_{1-8}$ monovalent substituted or unsubstituted hydrocarbon radicals which can be any of the radicals defined for $R^{11}$ with the caveat that desirably, there are no more than eight carbon atoms in the radical.

The other part of the definition of the compound of Formula (15) is that a varies from 0 to 2 and f varies from 0 to 3, where Q is selected from hydrogen and $C_{1-8}$ monovalent hydrocarbon radicals, and where the sum of a +f does not exceed 5 and there is at least one alkoxy radical in the compound of Formula (15). The reason for the restrictions on a and f is so that they will be in accordance with the description of the silazane compounds of the instant invention, and that there will be at least one alkoxy group in the molecule. It should be noted that the manner in which the compounds of the present invention distinguish over the compounds of that of Dziark, Ser. No. 349,695, filed Feb. 17, 1982, now U.S. Pat. No. 4,417,042, is that the compounds of the instant invention have hydrocarbonoxy groups in them. The compounds of the Dziark, Ser. No. 349,695 case, do not have hydrocarbonoxy groups in them. The advantages of the hydrocarbonoxy groups of the instant case have been set forth previously.

Further, in the definition of the compound of Formula (15) is that preferably s is a whole number that varies from 1-10 and is more preferably 1, and d is preferably a whole number that varies from 1-5 and is most preferably 1. It should be noted that the simpler alkoxy silazane compounds are the desirable ones since they are the easier to obtain and are the ones that are obtained in maximum yield. However, the higher molecular weight hydrocarbonoxy silazane compounds can also be utilized in the instant invention within the scope of the above formulas.

Further, in the foregoing Formula (15), A is preferably selected from the class consisting of hydrogen and the same $C_{1-8}$ monovalent substituted or unsubstituted hydrocarbon radicals as were defined previously for $R^{11}$. Most preferably, A can be selected from hydrogen, methyl or ethyl radicals, $-Si(CH_3)_3$, $-Si(OCH_3)(CH_3)_2$, $-Si(OCH_3)_2(CH_3)$, and $-Si(OCH_3)_3$ In the compounds of the foregoing Formulas (15) to (18), it is preferred that in one embodiment when the silazane compound is a scavenger, that $R^{10}$ and $R^{11}$ be methyl, and the Q radical be hydrogen.

In addition to the above, linear and branch-chained, non-cyclic silazane compounds, there can be utilized alkoxy-functional cyclic silazane compounds in the instant invention. Accordingly, there can be a cyclic silyl nitrogen scavenger having at least one or all of its units, units of Formula (16) and the rest of the units, if any, having Formula (17). Preferably, the compound is made up of units of Formula (16); however, the cyclic compound may have units of Formula (16) interspersed with Formula (17). However, the caveat holds that the cyclic compound must have at least one hydrocarbonoxy or alkoxy group in the compound as well as be a cyclic silazane compound to be utilized in the instant invention. Preferably, all of the units in the silyl nitrogen compound are selected from those of Formula (15).

It should be noted that in the instant application, there is a distinction between hydrocarbonoxy silazane compounds, whether linear or cyclic, which have at least one hydrocarbonoxy group in them and those that have at least three hydrocarbonoxy groups in them. The ones that have at least one—but less than three alkoxy groups—can be utilized as scavengers only in the instant invention. These hydrocarbonoxy silazane compounds of the instant case, which have at least three hydrocarbonoxy groups in the molecules can be utilized both as scavengers and integrated cross-linkers; i.e., the compound, if utilized in the proper quantities, will tie up unbonded hydroxy groups in the polymer mixture as well as act as a cross-linking agent to cross-link the base silanol material so as to form an alkoxy endcapped diorganopolysiloxane polymer, which, upon exposure to atmospheric moisture, will hydrolyze to form a silicone elastomer.

It should be noted further that the compound having at least three hydrocarbonoxy groups in it can also be utilized as a scavenger only irrespective of whether it can function as an integrated cross-linker. In any case, when there is utilized a cross-linker, and the silazane compound has at least three hydrocarbonoxy groups in it, some of the hydrocarbonoxy silazane compound will function as a cross-linking agent as well as a scavenger due to the statistical reactivity results of the composition.

In this respect, it should be noted that the hydrocarbonoxy silazane compound which has less than three hydrocarbonoxy groups in it can only function as a scavenger, with the possible exception of the case where s=1, Q=H, in accordance with Ser. No. 428,038, filed Sept. 29, 1982, and, accordingly, must be utilized with this concept in mind. With respect to quantities of the compound to be utilized, this is discussed elsewhere in the case, but as a guide, there may be utilized per 100 parts by weight of the silanol polymer, 1 to 12 and more preferably from 3 to 7 of a hydrocarbonoxy silazane compound. In the case where the hydrocarbonoxy silazane compound functions both as a cross-linking agent and as a scavenger, then per 100 parts by weight of the base silanol polymer, there is generally utilized 2.0 to 12 parts of the hydrocarbonoxy silazane compound, and preferably 3 to 8 parts of such compounds per 100 parts of the base silanol polymer. These concentration ranges are general, especially in the second case because how much of the hydrocarbonoxy compound that is used as both a cross-linking agent and a scavenger will depend on the amount of hydrocarbonoxy groups in the molecules of such hydrocarbonoxy silazane compounds. Further, though the cyclic silazane compound can be any cyclic silazane, most preferably it is a trisilazane or tetrasilazane since these are the most readily available cyclic silazanes. However, it can also be a pentasilazane or higher cyclosilazane. It must be appreciated, in the normal course of producing such cyclic silazanes, that most of the compounds that are produced are cyclic tetrasilazanes and cyclictrisilazanes. However, some higher cyclic silazanes are also produced and these higher cyclic silazanes in the mixture along with the cyclic trisilazanes and cyclotetrasilazanes can be used as scavengers or as both scavengers and cross-linking agents in the instant invention, depending on their hydrocarbonoxy functionality as is described below.

The reason for the fact that there must be at least three hydrocarbonoxy groups in the silazane molecules in order for the silazanes to function as a cross-linking agent as well as a scavenger, is that it is desirable that when the endcapping group ties up the silanol group at the terminal end of the polymer that there is appended to the silyl group at least two alkoxy groups. If this is the case, that is, most of the polymer is terminated by at least two hydrocarbonoxy or alkoxy groups, then such terminated base polymer will be shelf-stable and effectively crosslink to produce a shelf-stable composition.

The rest of the hydrocarbonoxy silazane can simply function to tie up other unbonded hydroxy groups in the polymer mixture that are present other than the hydroxy groups at the terminal end of the silanol-terminated diorganopolysiloxane base polymer. Further, as stated previously, while the above concentration ranges have been given for the silazane compounds, both in the case when they are utilized as scavengers only or when they are utilized as scavengers and cross-linking agents, these concentrations are just general guides and are not critical. What is important is that there be a minimum amount of silazane compound irrespective of whether it is to function as a scavenger only or both as a scavenger and an integrated cross-linker. Accordingly, this minimum amount of silazane compound is at least 3% excess over the stoichiometric amount needed to react with all the excess water and all the excess unbonded hydroxy groups in the polymer mixture, and generally, in most compositions, can be set at the level of at least one part by weight of scavenging silazane compound per 100 parts of the base silanol ene-stopped diorganopolysiloxane polymer.

When the integrated cross-linker scavenger compound is used, it is preferred that the endcapping reaction be catalyzed with the catalysts of this case. This is true also if the polyalkoxy cross-linking agent of Formula (7) is used for the end-capping reaction. For more information as to these alkoxy-functional silanols as integrated cross-linker scavengers one is referred to Chung, et al., Ser. No. 428,038, filed on the same date as the present application.

Before proceeding to the Examples, it is necessary to make certain points about the invention. First of all with regard to silanol end-stopped organopolysiloxane polymer of Formula (4), it is preferred that the silanol groups be on the terminal silicon atom. In such polymers, that is the polymers of Formula (4), some silanol groups can be tolerated in the polymer chain. Such silanol groups in the polymer chain will allow slightly more cross-linking to take place in the cure of the polymer. If there are too many silanol groups in the polymer chain, it may be difficult to completely cure the polymer. Preferably, however, most of the silanol groups are present on the terminal silicon atoms in the polymer chain of the polymer of Formula (4).

The second point that is to be made is that in the formation of the end-capped polymer produced by the reaction of either the polyalkoxy functional silane cross-linking agent or the integrated cross-linking agent, scavenger which reacted with the silanol end-stopped diorganopolysiloxane polymer, that is after such an end-capped polymer is formed, there may be present some polymer species having only monomethoxy groups or one or both ends of the polymer chain. All of the polymer species should not be of this particular type of specie since then considerable difficulty may be encountered in the cure of the composition. Thus, it is desirable in order to have a proper rate of cure or to have a fast curing RTV composition, that there be polyalkoxy groups on the terminal silicon atoms of most of the polymer species in the RTV composition.

Finally, as stated previously, the former basic amine end-capping catalyst work very ineffectively or not at all, as end-capping catalysts for some integrated cross linking agents, scavengers which are used to end-cap a silanol end-stopped diorganopolysiloxane polymer such as that of Formula (4). In the case of the alkoxy functional silazane integrated cross-linking agent scavengers of Chung, et al., Ser. No. 428,038, the traditional basic amine end-capping catalyst operate very poorly as end-capping catalyst. The present end-capping acidic agents of the present case are much superior as end-capping catalysts for such materials.

The Examples below are given for the purpose of illustrating the present invention. They are not given for any purpose of setting limits or boundaries to the instant invention. All parts in the Examples are by weight.

EXAMPLE 1

There was prepared a first polymer mixture which was mixed in a substantially anhydrous condition, comprising, 100 parts by weight of a silanol end-stopped dimethylpolysiloxane polymer having a viscosity in the range of 3000–6000 centipoise at 25° C.; 0.4 parts per weight of di-n-hexylamine and various amounts of dimethyltetramethoxydisilazane as indicated in Table I below. In this composition, there was also mixed various amounts of acid varying from 0 parts of acid to the amounts and types of acids shown in Table I below. This mixture was mixed under substantially anhydrous conditions using Semkit ® mixer, where the mixture was mixed for 15 minutes at room temperature to 60° C. The resulting polymer was then tested for the amount of end-capping which was determined by infrared spectra and in which the results of such infrared spectra analysis is shown in Table I below.

TABLE I

| Temp. °C. | $(CH_3Si(OCH_3)_2)_2NH$ (parts) | Acid | % End-capped |
|---|---|---|---|
| R.T. | 3.0 | No | 7 |
| R.T. | 1.0 | 2-ethyl hexanoic acid | 35 |
| R.T. | 2.0 | 2-ethyl hexanoic acid | 50 |
| R.T. | 3.0 | 2-ethyl hexanoic acid | 60 |
| R.T. | 3.0 | 2-ethyl hexanoic acid No di-n-hexylamine | 79 |
| R.T. | 2.5 | $CH_3SO_3H$ | 15 |
| R.T. | 2.5 | $HCO_2H$ | 21 |
| R.T. | 3.0 | $CH_3CO_2H$ | 52 |
| R.T. | 3.0 | $CF_3CO_2H$ | 14 |
| R.T. | 3.0 | $CH_3Si(O-\overset{O}{\overset{\|}{C}}-CH_3)_3$ | 51 |
| 50 | 4.0 | $CH_3CO_2H$ | 100 |
| 50 | 5.0 | $CH_3CO_2H$ | 100 |
| 60 | 6.0 | $CH_3CO_2H$ | 100 |
| 50 | 3.0 | $(CH_3CO)_2-O$ | 100 |
| 50 | 4.0 | $CH_3Si(C_8H_{15}O_2)_3$ | 100 |

As the results of the above table show, the use of an acid end-capping catalyst is much more effective than the n-diheylxamine alone in end-capping silanol end-stopped diorganopolysiloxane polymers with the alkoxy functional silazane, integrated cross-linker, scavengers.

EXAMPLE 2

There was prepared an RTV composition in two mixing steps. In the first mixing step, there was mixed for 15 minutes in the Semkit ® mixer at 50°–80° C. 100 parts by weight of a silanol end-stopped dimethylpolysiloxane polymer having a viscosity of 320,000 centipoise viscosity at 25° C.; 17 parts of an octamethyl cyclotetrasiloxane treated fumed silica; 20 parts by weight of a mixture of silanol end-stopped dimethylpolymer species, trimethyl siloxy and silanol end-stopped dimethylpolysiloxane polymer species and trimethyl siloxy end-stopped dimethylpolysiloxane polymer species, said mixture of polymer species having a viscosity of 100 centipoise at 25° C., and 10 parts by weight of M,D,T,OH fluid containing approximately 3 mole percent of dimethylsiloxane units; 25 mole percent of methylsiloxane units and approximately 0.5 weight percent silanol to which was added 4.5 parts of dimethyltetramethoxydisilazane; 0.1 to 0.2 parts of acetic and and 0.3 to 0.6 parts of di-n-hexylamine.

In a second mixing step, there was added to this composition, 0.3 to 0.5 parts of dibutyltindiacetate and 1.0 parts by weight of 50 centipoise at 25° C. viscosity of a trimethylsiloxy end-stopped dimethylpolysiloxane fluid which is a plasticizer fluid. After mixing, the RTV compositions were packed into sealed aluminum tubes and stored 24 hrs. at room temperature, 24 hours at 100° C. and 48 hours at 100° C. prior to exposure to room temperature to test the samples. The cure at 100° C. was for an accelerated shelf aging. Speed and degree of cure was determined by Tack Free Time. The results are shown in Table II below.

TABLE II

| Mixing Temp. (°C.) | HOAc (parts) | $HN(C_6H_{13})_2$ (parts) | $Bu_2Sn(OAc)_2$ (parts) |
|---|---|---|---|
| 50 | 0.15 | 0.5 | 0.35 |
| 50 | 0.15 | 0.45 | 0.55 |

| | TFT (min.) | | | |
|---|---|---|---|---|
| Initial | R.T. 24 hrs. | 100°/ 24 hrs. | 100°/ 48 hrs. | 100°/ 74 hrs. |
| 50 | 50 | 20 | — | 40 |
| 40 | 50 | 25 | | |

As the results of Table II indicate, the end-capped polymers of this instant composition have good shelf age.

EXAMPLE 3

There was prepared similar samples having the same compositions as Example 2 which were mixed the same way in which compositions there was also present an additional 1.0 parts of aminoethylaminopropyltrimethoxysilane. This additive was present as an adhesion promoter. The results are as follows as shown in Table III below.

TABLE III

| Temp. (°C.) | HOAc (parts) | $HN(C_6H_{13})_2$ (parts) | $[CH_3Si(OCH_3)_2]_2NH$ (parts) |
|---|---|---|---|
| 50 | 0.2 | 0.4 | 4.0 |
| 80 | 0.2 | 0.4 | 4.0 |
| 80 | None | 0.4 | 4.0 |

| | TFT (min.) | | | | |
|---|---|---|---|---|---|
| Initial | R.T. 24 hrs. | 100°/ 24 hrs. | R.T./ 48 hrs. | 100°/ 48 hrs. | 100°/ 74 hrs. |
| 15 | 30 | 30 | 30 | 30 | 30 |
| 15 | 30 | 30 | 30 | 30 | 30 |
| Gelled | — | — | — | — | — |

EXAMPLE 4

There was prepared, utilizing the mixing procedure of Example 1. a fourth formulation comprising as follows: 100 parts by weight of a methyldimethoxy end-capped dimethyl polysiloxane polymer of a viscosity having 3,000 to 6,000 centipoise at 25° C.; 0.1 part of an acetic acid, 0.5 parts of di-n-hexylamine and 0.3 parts by weight of dibutyltindiacetate. This mixture was mixed for 15 minutes at room temperature in a Semkit ® mixer. The end-cap polymer had in it the amounts of dimethyltetramethoxydisilazane indicated in Table IV below.

There is indicated in Table IV below, the amount of methanol in the compositions as determined by the infrared analysis.

TABLE IV

| [CH$_3$Si(OCH$_3$)$_2$]$_2$NH (parts) | CH$_3$OH (parts) |
|---|---|
| 2.5 | 0 |
| 3.5 | 0.14 |
| 4.0 | 0.21 |

| TFT (min.) | | | |
|---|---|---|---|
| Initial R.T./ | 100°/ 24 hrs. | R.T./ 48 hrs. | 100°/ 48 hrs. |
| 40 | 45 | 25 | 45 | 25 |
| 40 | 25 | 25 | 25 | 30 |
| 45 | 25 | 25 | 25 | 30 |

As the above results show, the compositions end-capped in accordance with the instant invention had good shelf stability.

EXAMPLE 5

There was prepared a base composition comprising 100 parts by weight of a silanol-terminated dimethylpolysiloxane polymer, 35 parts by weight of a trimethylsiloxy terminated polydimethylsiloxane containing 600 to 1500 parts per million of water; 180 parts by weight of stearic acid treated calcium carbonate sold as Hydrocarb 95T by OMYA of Vermont, 0.2 parts by weight of a polyether and 10 parts by weight of M, D, T, OH fluid having 3 mole percent of trimethylsiloxane, 72 mole percent of dimethylsiloxane units, 25 mole percent of methylsiloxane units and approximately 0.5 weight silanol. This composition was mixed in the first mixing step for 15 minutes at 50° C. to 80° C. and then the base material which shall be referred to herein as the base composition was separated and the two separate components were mixed with two different catalyst mixtures. Composition A was formed by taking 100 parts of the base composition and mixing with it 3 parts by weight of dimethyltetramethoxydisilazane, 0.07 parts by weight of dibutyltindiacetate and 0.01 parts by weight of aminoethyl aminopropyltrimethoxysilane, and 0.5 parts of n-dihexylamine. Composition B on the other hand was prepared by mixing 100 parts by weight of the base compound, 3 parts by weight of dimethyltetramethoxydisilazane, 0.075 parts of dibutyltindiacetate, 1.0 parts of aminoethyl aminopropyltrimethoxysilane, 0.5 parts of di-n-hexylamine, and 0.1 parts of methyltriacetoxysilane. It should be noted that Compositions A and B were made by two step catalyzations and Semkit ® mixer. Silazane was added in the first step, followed by a second catalyzation with the remaining constituents. In Composition B, the methyltriacetoxy silane was added with the disilazane. The cured samples were tested for physical properties, as well as for Tack Free Time after accelerated aging for 48 hours at 100° C. The Tack Free Time in minute is indicated in Table V below.

TABLE V

| Composition | A | B |
|---|---|---|
| Tack Free Time, | 16 | 15 |
| Shore A Hardness | 25 | 22 |
| Tensile, psi | 264 | 259 |
| Elongation, % | 220 | 220 |

TABLE V-continued

| Composition | A | B |
|---|---|---|
| 50% Modules, psi | 50 | 48 |
| 75% Modules, psi | 73 | 69 |
| 100% Modules, psi | 102 | 97 |
| Accelerated Use Tack Free Time 48 hrs/100° C. minutes | 16 | 14 |

As results of Table 5 above indicate, the composition without the acidifying agent yielded as good results or comparable results to the composition with the acidifying agent on end capping catalyst in it. It is postulated as stated previously that this was caused by the presence of the stearic acid calcium carbonate in which the stearic acid in the calcium carbonate acts as an end capping catalyst.

What I claim as new and desire to secure by Letters Patent of the United States is:

1. A one-package substantially anhydrous room temperature vulcanizable organopolysiloxane composition convertible to a tack-free elastomer, comprising: (1) an organopolysiloxane wherein the silicon atom at each polymer chain end is terminated with at least 1 hydroxy radical; (2) an effective amount of cross-linking agent; and (3) an effective amount of end-capping catalyst comprising a combination of (i) a Lewis acid and (ii) a compound selected from the group consisting of substituted guanidines, amines and mixtures thereof.

2. The composition of claim 1 wherein the cross-linking agent has the formula

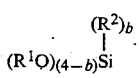

where R$^1$ is a C$_{(1-8)}$ aliphatic organic radical selected from the group consisting of alkyl, alkylester, alkylketone and alkylcyano radicals of a C$_{(7-13)}$ arakyl radical, R$_2$ is a C$_{(1-13)}$ monovalent substituted or unsubstituted hydrocarbon radical and b is a whole number equal to 0 or 1.

3. The composition of claim 1 wherein ingredient (3)(i) of the end-capping catalyst is an acid anhydride.

4. The composition of claim 1 wherein ingredient (3)(i) of the end-capping catalyst has the formula

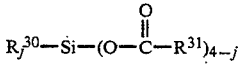

where R$^{30}$ and R$^{31}$ are C$_{(1-20)}$ monovalent hydrocarbon radicals and j is a whole number that varies from 0 to 3.

5. The composition of claim 1 wherein ingredient (3)(i) of the end-capping catalyst has the formula

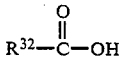

where R$^{32}$ is a C$_{(1-20)}$ monovalent hydrocarbon radical.

6. The composition of claim 1 wherein ingredient (3)(i) of the end-capping catalyst is an inorganic acid.

7. The composition of claim 6 wherein the inorganic acid is selected from the class consisting of HCl, H$_3$PO$_4$, H$_2$SO$_4$, and polyphosphoric acid.

8. The composition of claim 3 wherein the acid anhydride has the formula

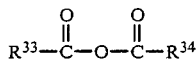

where $R^{33}$, $R^{34}$ are $C_{(1-20)}$ monovalent hydrocarbon radicals.

9. The composition of claim 1 wherein ingredient (3) (i) of the end-capping catalyst is selected from the group consisting of $BF_3$, $(CH_3CH_2)_2O$, and $AlCl_3$.

10. The composition of claim 1 wherein the total acid number does not exceed 15.

11. The composition of claim 1 wherein the acid number is at least 0.1.

12. The composition of claim 1 wherein ingredient (3) (i) is present at a concentration of 0.1 to 0.5 parts by weight per 100 parts by weight of the organopolysiloxane and ingredient (3) (ii) is present at a concentration of 0.1 to 0.5 parts by weight per 100 parts by weight of the organopolysiloxane.

13. A stable, one-package, substantially anhydrous and substantially acid-free, room temperature vulcanizable organopolysiloxane composition stable under ambient conditions in the substantial absence of moisture over an extended period of time and convertible to a tack-free elastomer comprising: (1) an organopolysiloxane wherein the silicon atom at each polymer chain end is terminated with at least 1 hydroxy radical: (2) an effective amount of a polyalkoxy cross-linking agent; (3) an effective amount of end-capping catalyst comprising a combination of (i) a Lewis acid and (ii) a compound selected from the group consisting of substituted guanidines, amines and mixtures thereof; (4) a stabilizing amount of silane scavenger for hydroxy functional groups having the formula

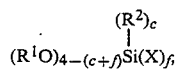

wherein $R^1$ is a $C_{(1-8)}$ aliphatic organic radical selected from the group consisting of alkyl, alkylether, alkylester, alkylketone, and alkylcyano radicals, or a $C_{(7-13)}$ aralkyl radicl, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato, and ureido radicals and, c is a whole number equal to 0 to 3 inclusive, f is an integer equal to 1 to 4 inclusive and the sum of c+f is equal to 1 to 4 inclusive; and (5) an effective amount of a condensation catalyst.

14. The composition of claim 13 wherein the cross-linking agent has the formula

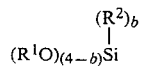

where $R^1$ is a $C_{(1-8)}$ aliphatic organic radical selected from the group consisting of alkyl, alkylester, alkylketone and alkylcyano radicals or a $C_{(7-13)}$ arakyl radical, $R^2$ is a $C_{(1-13)}$ monovalent substituted or unsubstituted hydrocarbon radical and b is a whole number equal to 0 or 1.

15. The composition of claim 13 wherein ingredient (3) (i) of the end-capping catalyst is an acid anhydride.

16. The composition of claim 13 wherein ingredient (3) (i) of the end-capping catalyst has the formula

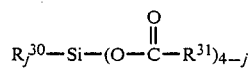

where $R^{30}$ and $R^{31}$ are $C_{(1-20)}$ monovalent hydrocarbon radicals and j is a whole number that varies from 0 to 3.

17. The composition of claim 13 wherein ingredient (3) (i) of the end-capping catalyst has the formula

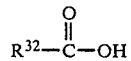

where $R^{32}$ is a $C_{(1-20)}$ monovalent hydrocarbon radical.

18. The composition of claim 13 wherein ingredient (3) (i) of the end-capping catalyst is an inorganic acid.

19. The composition of claim 18 wherein the inorganic acid is selected from the class consisting of HCl, $H_3PO_4$, $H_2SO_4$, and polyphosphoric acid.

20. The composition of claim 15 wherein the acid anhydride has the formula

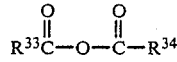

where $R^{33}$, $R^{34}$ are $C_{(1-20)}$ monovalent hydrocarbon radicals.

21. The composition of claim 13 wherein ingredient (3) (i) of the end-capping catalyst is selected from the group consisting of $BF_3$, $(CH_3CH_2)_2O$, and $AlCl_3$.

22. The composition of claim 13 wherein the total acid number does not exceed 15.

23. The composition of claim 13 wherein the total acid number is at least 0.1.

24. The composition of claim 13 wherein ingredient (3) (i) is present at a concentration of 0.1 to 0.5 parts by weight per 100 parts by weight of the organopolysiloxane and ingredient (3) (ii) is present at a concentration of 0.1 to 0.5 parts by weight per 100 parts by weight of the organopolysiloxane.

25. The composition of claim 13 wherein the scavenging silane has the formula

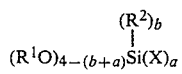

where $R^1$ is a $C_{(1-8)}$ aliphatic organic radical selected from the group consisting of alkyl, alkylether, alkylester, alkylketone and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals; and, a is an integer equal to 1 or 2 inclusive, b is a whole number equal to 0 to 1 inclusive and silane is both the silane scavenger for hydroxy functional groups and a polyalkoxysilane cross-linking agent for terminating the silicon atom at each organopolysiloxane chain end with at least two alkoxy radicals.

26. A room temperature vulcanizable composition in accordance with claim 13 where the silane scavenger is methyldimethoxy-N-methylacetamidosilane.

27. A room temperature vulcanizable composition in accordance with claim 13, which contains a tin compound as the condensation catalyst.

28. A room temperature vulcanizable composition in accordance with claim 13, where R, $R^1$ and $R^2$ are methyl and which has a tin compound as a condensation catalyst.

29. An RTV composition in accordance with claim 13 wherein the condensation catalyst is dibutyltindiacetate.

30. An RTV composition in accordance with claim 13 containing a polymethoxysilane cross-linking agent.

31. A one-package room temperature vulcanizable composition in accordance with claim 30, where the polymethoxysilane is methyltrimethoxysilane.

32. A one-package RTV in accordance with claim 13, where the substituted guanidine is butyltetramethylguanidine.

33. A one-package RTV in accordance with claim 13 wherein ingredient (3) (ii) is a dialkylamine.

34. A one-package, stable, room temperature vulcanizable composition in accordance with claim 13 having an excess of up to 3% by weight of silane scavenger based on the weight of the organopolysiloxane.

35. A room temperature vulcanizable composition in accordance with claim 13 wherein ingredient (3) (ii) is di-n-hexylamine.

36. A method of making a one-package and substantially acid-free room temperature vulcanizable composition curable to the solid elastomeric state, which method comprises agitating under substantially anhydrous conditions at a temperature in the range of from 0° C. to 180° C., a room temperature vulcanizable material comprising a mixture of
(a) 100 parts of a silanol-terminated polydiorganosiloxane consisting essentially of chemically combined units of the formula

(b) 0 to 10 parts of cross-linking agent and
(c) an effective amount of end-capping catalyst comprising a combination of (i) a Lewis acid and (ii) a compound selected from the group consisting of substituted guanidines, amines and mixtures thereof, where R is selected from $C_{(1-13)}$ monovalent substituted or unsubstituted hydrocarbon radicals.

37. A mixture comprising
(a) 100 parts of a silanol-terminated polydiorganosiloxane consisting essentially of chemically combined units of the formula

(b) a stabilizing amount of a silane scavenger for hydroxy functional groups of the formula

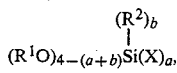

(c) 0 to 10 parts of cross-linking silane of the formula

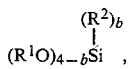

(d) an effective amount of end-capping catalyst comprising a combination of (i) a Lewis acid and (ii) a compound selected from the group consisting of substituted guanidines, amines and mixtures thereof, and
(e) an effective amount of condensation catalyst, where R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester, alkylketone and alkylcyano radicals or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals, and a is an integer equal to 1 or 2, b is a whole number equal to 0 or 1, and the sum of a+b is equal to 1 or 2.

38. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:
(a) an organopolysiloxane wherein the silicon atom at each polymer chain end is terminated with at least 1 hydroxy radical;
(b) optionally, a polyalkoxysilane cross-linking agent;
(c) an effective amount of end-capping catalyst comprising a combination of (i) a Lewis acid and (ii) a compound selected from the group consisting of substituted guanidines, amines and mixtures thereof;
(d) an effective amount of a condensation catalyst; and
(e) a stabilizing amount of a scavenger for hydroxy functional groups selected from the group consisting of non-cyclic silyl nitrogen compounds of the formula

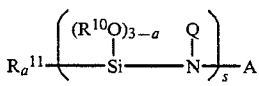

and cyclic silyl nitrogen compounds having at least one unit of the formula

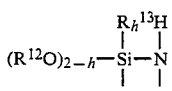

and the rest of the units, if any, having the formula

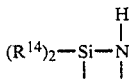

where $R^{10}$ and $R^{12}$ are $C_{1-8}$ aliphatic organic radicals selected from the group consisting of alkyl, alkylether, alkylester, alkylketone, alkylcyano and aryl, $R^{11}$, $R^{13}$ and $R^{14}$ are $C_{1-8}$ monovalent substituted or unsubstituted hydrocarbon radicals, a varies from 0 to 2, h is 0 or 1, s varies from 1 to 25, Q is selected from the group consisting of hydrogen, $C_{1-8}$ monovalent substituted or unsubstituted hydrocarbon radicals and radicals of the formula

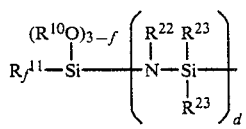

where $R^{10}$ is a $C_{1-8}$ aliphatic organic radical selected from the group consisting of alkyl, alkylether, alkylester, alkylketone, alkylcyano and aryl, $R^{11}$ is a $C_{1-8}$ monovalent substituted or unsubstituted hydrocarbon radical, f varies from 0 to 3, d is a whole number that varies from 1 to 25, $R^{22}$ is selected from the group consisting of hydrogen and $C_{1-8}$ monovalent hydrocarbon radicals and $R^{23}$ is selected from the group consisting of monovalent hydrocarbon radicals and hydrocarbonoxy radicals, A is selected from the group consisting of hydrogen, $C_{1-8}$ monovalent substituted and unsubstituted hydrocarbon radicals and radicals of the formula

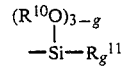

where $R^{10}$ is a $C_{1-8}$ aliphatic organic radical selected from the group consisting of alkyl, alkylether, alkylester, alkylketone, alkylcyano and aryl, $R^{11}$ is a $C_{1-8}$ monovalent substituted or unsubstituted hydrocarbon radical, g varies from 0 to 3, and in the above scavenger there is at least one hydrocarbonoxy group in the molecule.

39. A room temperature vulcanizable composition in accordance with claim 38, having an effective amount of a cross-linking silane of the formula

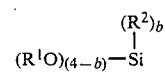

where $R^1$ is a $C_{1-8}$ aliphatic organic radical selected from the group consisting of alkyl, alkylether, alkylester, alkylketone and alkylcyano radicals, or a $C_{7-13}$ aralkyl radical, $R^2$ is a $C_{1-13}$ monovalent substituted or unsubstituted hydrocarbon radical, and b is a whole number equal to 0 or 1.

40. A method of making a one-package and substantially acid-free room temperature vulcanizable composition curable to the solid elastomeric state, which method comprises agitating under substantially anhydrous conditions at a temperature in the range of from 0° C. to 180° C., a room temperature vulcanizing material comprising a mixture of:

(i) 100 parts of a silanol-terminated polysiloxane consisting essentially of chemically combined units of the formula

(ii) a stabilizing amount of a scavenger for hydroxy functional groups selected from the group consisting of non-cyclic silyl nitrogen compounds of the formula

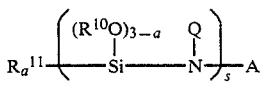

and cyclic silyl nitrogen compounds having at least one unit of the formula

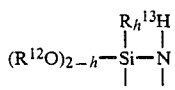

and the rest of the units, if any, having the formula

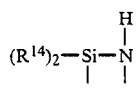

where R is a $C_{1-13}$ monovalent substituted or unsubstituted hydrocarbon radical, $R^{10}$ and $R^{12}$ are $C_{1-8}$ aliphatic organic radicals selected from the group consisting of alkyl, alkylether, alkylester, alkylketone, alkylcyano and aryl, $R^{11}$, $R^{13}$ and $R^{14}$ are $C_{1-8}$ monovalent substituted or unsubstituted hydrocarbon radicals, a varies from 0 to 2, h is 0 or 1, s varies from 1 to 25, Q is selected from the group consisting of hydrogen, $C_{1-8}$ hydrocarbon radicals, and radicals of the formula

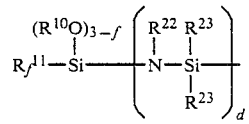

where d is a whole number that varies from 1 to 25 and f varies from 0 to 3, $R^{22}$ is selected from the group consisting of hydrogen and $C_{1-8}$ monovalent hydrocarbon radicals and $R^{23}$ is independently selected from $C_{1-8}$ monovalent hydrocarbon radicals and hydrocarbonoxy radicals, A is selected from the group consisting of hydrogen, $C_{1-8}$ monovalent substituted and unsubstituted hydrocarbon radicals and radicals of the formula

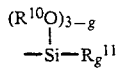

where $R^{10}$ is a $C_{1-8}$ aliphatic organic radical selected from the group consisting of alkyl, alkylether, alkylester, alkylketone, alkylcyano and aryl, $R^{11}$ is a $C_{1-8}$ monovalent substituted or unsubstituted hydrocarbon radical, g varies from 0 to 3, and in the above scavengers there is at least one hydrocarbonoxy group in the molecule,
(iii) 0–10 parts of polyalkoxy cross-linking silane,
(iv) an effective amount of end-capping catalyst comprising a combination of (a) a Lewis acid and (b) a compound selected from the group consisting of substituted guanidines, amines and mixtures thereof; and
(v) an effective amount of condensation catalyst.

41. A mixture comprising:
(a) 100 parts of a silanol terminated polydiorganosiloxane consisting essentially of chemically combined units of the formula

(b) a stabilizing amount of scavenger for hydroxy functional groups selected from the group consisting of non-cyclic silyl nitrogen compounds of the formula

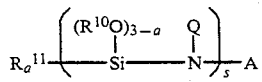

and cyclic silyl nitrogen compounds having at least one unit of the formula

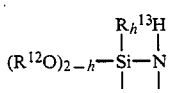

and the rest of the units, if any, having the formula

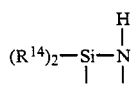

where R is a $C_{1-13}$ monovalent substituted or unsubstituted hydrocarbon radical, $R^{10}$ and $R^{12}$ are $C_{1-8}$ aliphatic organic radicals selected from the group consisting of alkyl, alkylether, alkylester, alkylketone, alkylcyano and aryl, $R^{11}$, $R^{13}$ and $R^{14}$ are $C_{1-8}$ monovalent substituted or unsubstituted hydrocarbon radicals, a varies from 0 to 2, h is 0 or 1, s varies from 1 to 25, Q is selected from the group consisting of hydrogen, $C_{1-8}$ monovalent substituted or unsubstituted hydrocarbon radicals and radicals of the formula

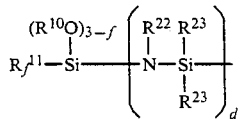

where $R^{10}$ is a $C_{1-8}$ aliphatic organic radical selected from the group consisting of alkyl, alkylether, alkylester, alkylketone, alkylcyano and aryl, $R^{11}$ is a $C_{1-8}$ monovalent substituted or unsubstituted hydrocarbon radical, f varies from 0 to 3, d is a whole number that varies from 1 to 25, $R^{22}$ is selected from the group consisting of hydrogen and $C_{1-8}$ monovalent hydrocarbon radicals and $R^{23}$ is independently selected from $C_{1-8}$ monovalent hydrocarbon radicals and hydrocarbonoxy radicals, A is selected from the group consisting of hydrogen, $C_{1-8}$ monovalent substituted or unsubstituted hydrocarbon radicals and radicals of the formula

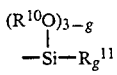

where $R^{10}$ is a $C_{1-8}$ aliphatic organic radical selected from the group consisting of alkyl, alkylether, alkylester, alkylketone, alkylcyano and aryl, $R^{11}$ is a $C_{1-8}$ monovalent substituted or unsubstituted hydrocarbon radical, and g varies from 0 to 3, wherein in the above scavenger there is at least one hydrocarbonoxy group in the molecule,
(c) 0 to 10 parts of polyalkoxy cross-linking silane;
(d) an effective amount of end-capping catalyst comprising a combination of (i) a Lewis acid and (ii) a compound selected from the group consisting of substituted guanidines, amines and mixtures thereof; and
(e) an effective amount of condensation catalyst.

42. The mixture of claim 41, wherein the scavenger and cross-linking agent has the formula

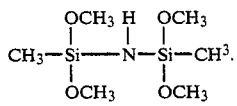

43. The composition of claim 41 wherein ingredient (d) (i) of the end-capping catalyst is an acid anhydride.

44. The composition of claim 41 wherein ingredient (d) (i) of the end-capping catalyst has the formula

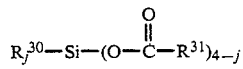

where $R^{30}$ and $R^{31}$ are $C_{(1-20)}$ monovalent hydrocarbon radicals and j is a whole number that varies from 0 to 3.

45. The composition of claim 41 wherein ingredient (d) (i) of the end-capping catalyst has the formula

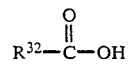

where $R^{32}$ is a $C_{(1-20)}$ monovalent hydrocarbon radical.

46. The composition of claim 41 wherein ingredient (d) (i) of the end-capping catalyst is an inorganic acid.

47. The composition of claim 46, wherein the inorganic acid is selected from the group consisting of HCl, $H_3PO_4$, $H_2SO_4$, and polyphosphoric acid.

48. The composition of claim 43 wherein the acid anhydride has the formula

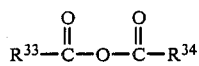

where $R^{33}$, $R^{34}$ are $C_{(1-20)}$ monovalent hydrocarbon radicals.

49. The composition of claim 41 wherein ingredient (d) (i) of the end-capping catalyst is selected from the group consisting of $BF_3$, $(CH_3CH_2)_2O$, and $AlCl_3$.

50. The composition of claim 41 wherein the total acid number does not exceed 15.

51. The composition of claim 41 wherein the total acid number is at least 0.1.

52. The composition of claim 41 wherein ingredient (d) (i) is present at a concentration of 0.1 to 0.5 parts by weight per 100 parts by weight of the organopolysiloxane and ingredient (d) (ii) is present at a concentration of 0.1 to 0.5 parts by weight per 100 parts by weight of the organopolysiloxane.

53. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising:
  (1) an organopolysiloxane wherein the silicon atom at each polymer chain end is terminated with at least 1 hydroxy radical;
  (2) a polyalkoxy cross-linking agent;
  (3) an effective amount of end-capping catalyst comprising a combination of (i) a Lewis acid and (ii) a compound selected from the group consisting of substituted guanidines, amines and mixtures thereof;
  (4) an effective amount of condensation catalyst; and
  (5) a stabilizing amount of a scavenger for hydroxy functional groups which is a silicon-nitrogen compound selected from the group consisting of:
  (A) silicon-nitrogen compounds having the formula

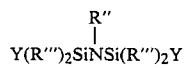

where Y is selected from R''' and $R''_2N-$ and
  (B) silicon-nitrogen polymers comprising (1) from 3 to 100 mole percent chemically combined structural units having the formula

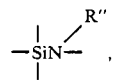

and (2) from 0 to 97 mole percent chemically combined structural units represented by the formula

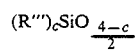

where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R''' radical and an $(R'')_2N$ radical and where the ratio of the sum of said R''' radicals and said $(R'')_2N$ radicals to the silicon atoms of said silicon-nitrogen polymer has a value of 1.5 to 3, inclusive, and R'' is a member selected from the group consisting of hydrogen, monovalent hydrocarbon radicals, and fluoroalkyl radicals, R''' is a member selected from the group consisting of hydrogen, monovalent hydrocarbon radicals and fluoroalkyl radicals, and c is a whole number equal to 0 to 3, inclusive.

54. A method of making a one-package and substantially acid-free room temperature vulcanizable composition curable to the solid elastomeric state, which method comprises agitating under substantially anhydrous conditions at a temperature in the range of from 0° C. to 180° C., a room temperature vulcanizable material comprising a mixture of
  (A) 100 parts of a silanol-terminated polydiorganosiloxane consisting essentially of chemically combined units of the formula

(B) from 1 to 10 parts of an alkoxy-functional cross-linking silane;
  (C) an effective amount of end-capping catalyst comprising a combination of (i) a Lewis acid and (ii) a compound selected from the group consisting of substituted guanidines, amines and mixtures thereof; and
  (D) a stabilizing amount of a scavenger for hydroxy functional groups selected from the group consisting of silicon-nitrogen compounds having the formula

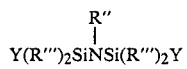

where Y is selected from R''' and $R''_2 N$ and a silicon-nitrogen polymer comprising (1) from 3 to 100 mole percent chemically combined structural units having the formula

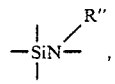

and (2) from 0 to 97 mole percent chemically combined structural units represented by the formula

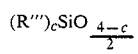

where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silazy unit are joined to a member selected from an R''' radical and an (R'')$_2$N radical, and where the ratio of the sum of said R''' radicals and said (R'')$_2$N radicals to silicon atoms of said silicon-nitrogen polymer has a value of 1.5 to 3, inclusive, and R'' is a member selected from the group consisting of hydrogen, monovalent hydrocarbon radicals and fluoroalkyl radicals, R''' is a member selected from the group consisting of hydrogen, monovalent hydrocarbon radicals and fluoroalkyl radicals, and c is a whole number equal to 0 to 3 inclusive, and (E) an effective amount of condensation catalyst.

55. A mixture comprising (A) 100 parts of a silanol-terminated polydiorganosiloxane consisting essentially of chemically combined units of the formula

(B) 1 to 10 parts of a polyalkoxy cross-linking silane;

(C) an effective amount of end-capping catalyst, comprising a combination of (i) a Lewis acid and (ii) a compound selected from the group consisting of substituted guanidines, amines and mixtures thereof;

(D) a stabilizing amount of scavenger for hydroxy functional groups selected from the group consisting of silicon-nitrogen compounds having the formula

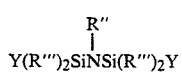

where Y is selected from R''' and R''$_2$N and silicon-nitrogen polymers comprising (1) from 3 to 100 mole percent chemically combined structural units having the formula

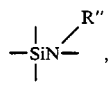

and (2) from 0 to 97 mole percent chemically combined structural units represented by the formula

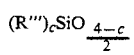

where the silicon atoms of said silicon-nitrogen polymer are joined to each other by a member selected from an SiOSi linkage and a SiNR''Si linkage, the free valences of said silicon atoms other than those joined to oxygen to form a siloxy unit and nitrogen to form a silajy unit are joined to a member selected from an R''' radical and an (R'')$_2$N radical, and where the ratio of the sum of said R''' radicals and said (R'')$_2$N radicals to the silicon atoms of said silicon-nitrogen polymer has a value of 1.5 to 3, inclusive, and R'' is a member selected from the group consisting of hydrogen, monovalent hydrocarbon radicals, anf fluoroalkyl radicals, R''' is a member selected from the group consisting of hydrogen, monovalent hydrocarbon radicals and fluoroalkyl radicals, and c is a whole number equal to 0 to 3, inclusive, and (E) an effective amount of condensation catalyst, where R is selected from C$_{(1-13)}$ monovalent substituted or unsubstituted hydrocarbon radicals.

56. The composition of claim 55 wherein ingredient (C) (i) of the end-capping catalyst is an acid anhydride.

57. The composition of claim 55 wherein ingredient (C) (i) of the end-capping catalyst has the formula

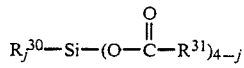

where R$^{30}$ and R$^{31}$ are C$_{(1-20)}$ monovalent hydrocarbon radicals and j is a whole number that varies from 0 to 3.

58. The composition of claim 55 wherein ingredient (C) (i) of the end-capping catalyst has the formula

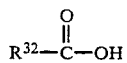

where R$^{32}$ is a C$_{(1-20)}$ monovalent hydrocarbon radical.

59. The composition of claim 55 wherein ingredient (C) (i) of the end-capping catalyst is an inorganic acid.

60. The composition of claim 59 wherein the inorganic acid is selected from the group consisting of HCl, H$_3$PO$_4$, H$_2$SO$_4$, and polyphosphoric acid.

61. The composition of claim 56 wherein the acid anhydride has the formula

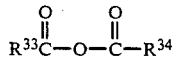

where R$^{33}$, R$^{34}$ are C$_{(1-20)}$ monovalent hydrocarbon radicals.

62. The composition of claim 55 wherein ingredient (C) (i) of the end-capping catalyst is selected from the group consisting of BF$_3$, (CH$_3$CH$_2$)$_2$O, and AlCl$_3$.

63. The composition of claim 55 wherein the total acid number does not exceed 15.

64. The composition of claim 55 wherein the total acid number is at least 0.1.

65. A stable, one-package, substantially anhydrous and substantially acid-free, room temperature vulcanizable organopolysiloxane composition stable under ambient conditions in the substantial absence of moisture over an extended period of time and convertible to a tack-free elastomer, comprising (1) an organopolysiloxane wherein the silicon atom at each polymer chain end is terminated with at least one hydroxy radical; (2) a polyalkoxy cross-linking agent; (3) an effective amount of end-capping catalyst comprising a combination of (i) a Lewis acid and (ii) a compound selected from the group consisting of substituted guanidines, amines and mixtures thereof; and (4) a stabilizing amount of silane scavenger for hydroxy functional groups which is a silyl amine of the formula

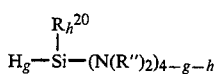

where R'' is a radical selected from the group consisting of hydrogen and C$_{(1-8)}$ monovalent hydrocarbon radicals, R$^{20}$ is a radical selected from the group consisting of C$_{(1-8)}$ monovalent hydrocarbon radicals and C$_{(1-8)}$ alkoxy radicals and fluoroalkyl radicals, and g is a whole number that varies from 1 to 3, h is a whole number that varies from 0 to 2 and the sum of h+g does not exceed 3.

* * * * *